United States Patent
Zediker et al.

(10) Patent No.: US 11,612,957 B2
(45) Date of Patent: Mar. 28, 2023

(54) METHODS AND SYSTEMS FOR WELDING COPPER AND OTHER METALS USING BLUE LASERS

(71) Applicant: Nuburu, Inc., Centennial, CO (US)

(72) Inventors: Mark S Zediker, Castle Rock, IL (US); Robert D Fritz, Aurora, CO (US); Mathew Finuf, Castle Rock, CO (US); Jean-Michel Pelaprat, Saratoga, CA (US)

(73) Assignee: Nuburu, Inc., Centennial, CO (US)

( * ) Notice: Subject to any disclaimer, the term of this patent is extended or adjusted under 35 U.S.C. 154(b) by 110 days.

(21) Appl. No.: 16/730,852

(22) Filed: Dec. 30, 2019

(65) Prior Publication Data

US 2020/0206844 A1    Jul. 2, 2020

Related U.S. Application Data

(63) Continuation-in-part of application No. 15/884,672, filed on Jan. 31, 2018, now Pat. No. 10,940,562, and
(Continued)

(51) Int. Cl.
  *B23K 26/24* (2014.01)
  *B23K 26/06* (2014.01)
  (Continued)

(52) U.S. Cl.
  CPC .......... *B23K 26/24* (2013.01); *B23K 26/064* (2015.10); *B23K 26/0622* (2015.10);
  (Continued)

(58) Field of Classification Search
  CPC .. B23K 26/082; B23K 35/38; B23K 26/0626; B23K 26/142; B23K 26/0622;
  (Continued)

(56) References Cited

U.S. PATENT DOCUMENTS 4,288,678 A * 9/1981 La Rocca .......... B23K 26/0643
219/121.65
4,556,903 A * 12/1985 Blitchington ........ G01N 21/956
348/126
(Continued)

FOREIGN PATENT DOCUMENTS

CN     104742376    7/2015
DE   102013011676    1/2013
(Continued)

OTHER PUBLICATIONS

2012, Jürgen Bertling, DDM—An Approach Towards Sustainable Production?
(Continued)

*Primary Examiner* — Eric S Stapleton
(74) *Attorney, Agent, or Firm* — Glen P. Belvis; Belvis Law, LLC.

(57) ABSTRACT

A visible light laser system and operation for welding materials together. A blue laser system that forms essentially perfect welds for copper based materials. A blue laser system and operation for welding conductive elements, and in particular thin conductive elements, together for use in energy storage devices, such as battery packs.

20 Claims, 20 Drawing Sheets

Related U.S. Application Data a continuation-in-part of application No. 15/581,928, filed on Apr. 28, 2017.

(60) Provisional application No. 62/786,511, filed on Dec. 30, 2018, provisional application No. 62/452,598, filed on Jan. 31, 2017, provisional application No. 62/329,830, filed on Apr. 29, 2016.

(51) Int. Cl.
    *B23K 26/0622*    (2014.01)
    *B23K 26/064*     (2014.01)
    *B23K 26/142*     (2014.01)
    *B23K 26/244*     (2014.01)
    *B23K 35/38*      (2006.01)
    *B23K 37/04*      (2006.01)
    *B23K 101/36*     (2006.01)
    *B23K 103/12*     (2006.01)
    *B23K 103/10*     (2006.01)
    *B23K 103/04*     (2006.01)

(52) U.S. Cl.
    CPC ...... *B23K 26/0626* (2013.01); *B23K 26/0665* (2013.01); *B23K 26/142* (2015.10); *B23K 26/244* (2015.10); *B23K 35/38* (2013.01); *B23K 37/0435* (2013.01); *B23K 2101/36* (2018.08); *B23K 2103/05* (2018.08); *B23K 2103/10* (2018.08); *B23K 2103/12* (2018.08)

(58) Field of Classification Search
    CPC .............. B23K 26/244; B23K 26/0665; B23K 26/064; B23K 26/0884; B23K 26/24; B23K 37/0435; B23K 26/32; B23K 2103/10; B23K 2101/18; B23K 2101/36; B23K 2103/12; B23K 2103/05
    USPC .................................................... 219/121.64
    See application file for complete search history.

(56) References Cited

U.S. PATENT DOCUMENTS

| | | | | |
|---|---|---|---|---|
| 4,600,951 A * | 7/1986 | Blitchington | ........ | G01N 21/956 358/481 |
| 4,679,198 A * | 7/1987 | Shone | ............ | C30B 29/32 372/40 |
| 4,847,479 A * | 7/1989 | Clark | ............ | H01S 5/0687 250/201.1 |
| 4,857,699 A * | 8/1989 | Duley | ............ | B23Q 35/128 219/121.85 |
| 4,879,449 A * | 11/1989 | Duley | ............ | B23Q 35/128 219/121.6 |
| 4,930,855 A * | 6/1990 | Clark | ............ | G02B 6/2931 359/566 |
| 4,960,973 A * | 10/1990 | Fouche | ............ | B23K 26/60 219/121.64 |
| 4,973,819 A * | 11/1990 | Thatcher | ............ | B23K 26/10 219/121.63 |
| 5,127,019 A * | 6/1992 | Epstein | ............ | C21D 10/005 372/108 |
| 5,250,235 A * | 10/1993 | Cook | ............ | B29C 66/73921 156/272.8 |
| 5,379,310 A * | 1/1995 | Papen | ............ | H01S 5/4062 372/102 |
| 5,392,308 A * | 2/1995 | Welch | ............ | H01S 5/1014 372/92 |
| 5,502,292 A * | 3/1996 | Pernicka | ............ | B23K 26/24 219/121.63 |
| 5,526,155 A * | 6/1996 | Knox | ............ | G02B 6/2931 370/480 |
| 5,578,227 A * | 11/1996 | Rabinovich | ............ | B29C 64/141 219/121.63 |
| 5,808,803 A * | 9/1998 | Ullmann | ............ | G02B 6/4249 359/641 |
| 5,903,583 A * | 5/1999 | Ullman | ............ | H01L 33/648 372/35 |
| 5,923,475 A * | 7/1999 | Kurtz | ............ | G02B 19/0057 359/619 |
| 5,986,794 A * | 11/1999 | Krause | ............ | G02B 27/09 359/196.1 |
| 5,987,043 A * | 11/1999 | Brown | ............ | H01S 5/4043 372/36 |
| 6,060,685 A * | 5/2000 | Chou | ............ | B23K 26/032 219/121.83 |
| 6,124,973 A * | 9/2000 | Du | ............ | G02B 27/09 359/618 |
| 6,129,884 A * | 10/2000 | Beers | ............ | B33Y 30/00 264/401 |
| 6,151,168 A * | 11/2000 | Goering | ............ | G02B 27/09 359/623 |
| 6,175,452 B1 * | 1/2001 | Ullmann | ............ | G02B 27/09 359/618 |
| 6,191,383 B1 * | 2/2001 | Jense | ............ | B23K 26/067 219/121.63 |
| 6,212,310 B1 * | 4/2001 | Waarts | ............ | G02B 6/29319 372/43.01 |
| 6,251,328 B1 * | 6/2001 | Beyer | ............ | B21D 5/00 264/400 |
| 6,327,292 B1 * | 12/2001 | Sanchez-Rubio | ..... | H01S 5/4062 372/102 |
| 6,331,692 B1 * | 12/2001 | Krause | ............ | B23K 26/04 219/121.67 |
| 6,575,863 B2 * | 6/2003 | Skurka | ............ | F16G 13/04 474/215 |
| 6,584,133 B1 * | 6/2003 | Walker | ............ | H01S 5/4062 372/101 |
| 6,591,040 B1 * | 7/2003 | Dempewolf | ......... | G02B 6/2931 385/24 |
| 7,001,467 B2 * | 2/2006 | Pique | ............ | C23C 14/048 118/722 |
| 7,006,549 B2 * | 2/2006 | Anikitchev | ............ | G02B 27/09 372/107 |
| 7,034,992 B2 * | 4/2006 | Komine | ............ | G02B 6/02042 359/334 |
| 7,153,384 B2 * | 12/2006 | Sugawara | ............ | B29C 66/7392 156/272.8 |
| 7,233,442 B1 * | 6/2007 | Brown | ............ | G02B 27/1006 359/556 |
| 7,570,856 B1 * | 8/2009 | Minelly | ............ | H01S 3/06716 385/124 |
| 7,744,804 B2 * | 6/2010 | Nakagawa | ............ | C08K 5/0041 264/482 |
| 7,765,022 B2 * | 7/2010 | Mazumder | ............ | B23K 26/032 700/121 |
| 7,959,353 B2 * | 6/2011 | Anantharaman | ... | B29C 65/8261 374/4 |
| 8,130,807 B2 * | 3/2012 | Schulz-Harder | ...... | H01S 5/4025 372/50.12 |
| 8,488,245 B1 * | 7/2013 | Chann | ............ | G02B 19/0014 359/618 |
| 8,520,311 B2 * | 8/2013 | Krause | ............ | G02B 19/0057 359/641 |
| 8,553,327 B2 * | 10/2013 | Chann | ............ | G02B 19/0014 359/556 |
| 8,559,107 B2 | 10/2013 | Chann | | |
| 8,670,180 B2 * | 3/2014 | Chann | ............ | G02B 19/0014 359/556 |
| 8,724,222 B2 * | 5/2014 | Chann | ............ | G02B 19/0028 359/621 |
| 9,093,822 B1 * | 7/2015 | Chann | ............ | H01S 5/4012 |
| 9,104,029 B2 * | 8/2015 | Tayebati | ............ | G02B 27/1006 |
| 9,172,208 B1 | 10/2015 | Dawson | | |
| 9,178,333 B2 * | 11/2015 | Tayebati | ............ | H01S 5/3401 |
| 9,190,807 B2 * | 11/2015 | Tayebati | ............ | H01S 5/141 |
| 9,203,209 B2 * | 12/2015 | Ramachandran | ... | H01S 3/06725 |
| 9,256,073 B2 * | 2/2016 | Chann | ............ | G02B 5/18 |
| 9,268,097 B2 * | 2/2016 | Huang | ............ | G02B 6/262 |
| 9,268,142 B2 | 2/2016 | Chann | | |

(56) References Cited

U.S. PATENT DOCUMENTS

| | | | |
|---|---|---|---|
| 9,310,560 B2* | 4/2016 | Chann | G02B 6/32 |
| 10,940,562 B2* | 3/2021 | Finuf | B23K 26/0604 |
| 2001/0023921 A1* | 9/2001 | Mano | H04N 1/50 |
| | | | 250/234 |
| 2002/0064341 A1* | 5/2002 | Fauver | G02B 6/245 |
| | | | 385/25 |
| 2002/0126715 A1* | 9/2002 | Gerstenberger | G02F 1/353 |
| | | | 372/22 |
| 2002/0149137 A1* | 10/2002 | Jang | B33Y 30/00 |
| | | | 264/494 |
| 2003/0048819 A1* | 3/2003 | Nagano | H01S 5/4031 |
| | | | 372/36 |
| 2003/0052105 A1* | 3/2003 | Nagano | B23K 26/0604 |
| | | | 219/121.83 |
| 2003/0053048 A1* | 3/2003 | Bennett | G01J 3/02 |
| | | | 356/301 |
| 2003/0063631 A1* | 4/2003 | Corcoran | H01S 5/4062 |
| | | | 372/18 |
| 2003/0142393 A1* | 7/2003 | Kuksenkov | H01S 3/06791 |
| | | | 359/341.1 |
| 2004/0027631 A1 | 2/2004 | Nagano | |
| 2004/0036242 A1* | 2/2004 | DiStaulo | B62D 49/04 |
| | | | 280/62 |
| 2004/0056006 A1* | 3/2004 | Jones | B29C 65/1683 |
| | | | 219/121.64 |
| 2004/0086004 A1* | 5/2004 | Bonaccini | H01S 3/094015 |
| | | | 372/6 |
| 2004/0110880 A1* | 6/2004 | Sugawara | B29C 66/12841 |
| | | | 524/155 |
| 2004/0144483 A1* | 7/2004 | Sugawara | B23K 26/18 |
| | | | 156/272.8 |
| 2004/0156401 A1* | 8/2004 | Sandrock | C03C 25/104 |
| | | | 372/6 |
| 2004/0173587 A1* | 9/2004 | Musselman | B23K 26/0093 |
| | | | 219/121.64 |
| 2004/0254474 A1* | 12/2004 | Seibel | A61B 5/0066 |
| | | | 600/473 |
| 2005/0003301 A1* | 1/2005 | Sugawara | B29C 66/7332 |
| | | | 430/270.1 |
| 2005/0173385 A1* | 8/2005 | Smart | B23K 26/40 |
| | | | 219/121.61 |
| 2006/0151099 A1* | 7/2006 | Yamamoto | B29C 66/1282 |
| | | | 156/272.8 |
| 2006/0160332 A1* | 7/2006 | Gu | B23K 26/0622 |
| | | | 438/463 |
| 2007/0041083 A1* | 2/2007 | Di Teodoro | G02B 6/02347 |
| | | | 359/333 |
| 2007/0207186 A1* | 9/2007 | Scanlon | A61F 2/91 |
| | | | 424/424 |
| 2007/0292651 A1* | 12/2007 | Sugawara | B29C 65/1635 |
| | | | 428/57 |
| 2008/0052904 A1* | 3/2008 | Schneider | H01L 21/486 |
| | | | 29/846 |
| 2008/0083706 A1* | 4/2008 | Kirmeier | B23K 26/0846 |
| | | | 219/72 |
| 2008/0085368 A1* | 4/2008 | Gauthier | B23K 26/0876 |
| | | | 427/314 |
| 2008/0159111 A1* | 7/2008 | Akiba | G11B 7/121 |
| | | | 369/112.01 |
| 2009/0051935 A1* | 2/2009 | Cooper | G02B 26/101 |
| | | | 356/616 |
| 2009/0190218 A1* | 7/2009 | Govorkov | H01S 5/4012 |
| | | | 359/489.08 |
| 2009/0225793 A1* | 9/2009 | Marciante | H01S 3/302 |
| | | | 372/6 |
| 2010/0220580 A1* | 9/2010 | Imai | G11B 7/0932 |
| | | | 369/244.1 |
| 2010/0290106 A1* | 11/2010 | DiGiovanni | H01S 3/06733 |
| | | | 359/334 |
| 2010/0315184 A1* | 12/2010 | Morimoto | G11B 7/22 |
| | | | 335/209 |
| 2011/0067041 A1* | 3/2011 | Akutsu | G11B 7/22 |
| | | | 720/703 |
| 2011/0122482 A1* | 5/2011 | Mead | H01S 3/0675 |
| | | | 359/327 |
| 2011/0129615 A1* | 6/2011 | Renn | C23C 18/143 |
| | | | 427/555 |
| 2011/0205349 A1* | 8/2011 | Li | G02B 6/03644 |
| | | | 348/65 |
| 2011/0216792 A1* | 9/2011 | Chann | G02B 19/009 |
| | | | 372/31 |
| 2011/0267671 A1* | 11/2011 | Peng | H01S 3/115 |
| | | | 359/257 |
| 2011/0311389 A1* | 12/2011 | Ryan | B22F 3/15 |
| | | | 419/27 |
| 2012/0012570 A1* | 1/2012 | Briand | B23K 26/1436 |
| | | | 219/121.72 |
| 2012/0285936 A1* | 11/2012 | Urashima | G01B 9/02069 |
| | | | 219/121.63 |
| 2013/0028276 A1 | 1/2013 | Minelly | |
| 2013/0071738 A1* | 3/2013 | Wang | C25D 5/02 |
| | | | 429/211 |
| 2013/0105556 A1* | 5/2013 | Abell | G05B 1/00 |
| | | | 228/1.1 |
| 2013/0105557 A1* | 5/2013 | Spicer | B23K 20/10 |
| | | | 228/104 |
| 2013/0148673 A1* | 6/2013 | Creeden | H01S 3/09408 |
| | | | 372/6 |
| 2013/0162952 A1* | 6/2013 | Lippey | G02B 27/48 |
| | | | 353/7 |
| 2013/0269748 A1* | 10/2013 | Wiedeman | H01L 31/1876 |
| | | | 136/244 |
| 2014/0023098 A1* | 1/2014 | Clarkson | H01S 3/07 |
| | | | 372/3 |
| 2014/0086539 A1* | 3/2014 | Goutain | F21K 9/64 |
| | | | 385/89 |
| 2014/0112357 A1* | 4/2014 | Abedin | H01S 3/302 |
| | | | 372/3 |
| 2014/0249495 A1* | 9/2014 | Mumby | A61F 13/00063 |
| | | | 604/359 |
| 2014/0252687 A1* | 9/2014 | El-Dasher | B22F 10/20 |
| | | | 264/497 |
| 2015/0033343 A1 | 1/2015 | Jiang | |
| 2015/0136840 A1 | 5/2015 | Zhao | |
| 2015/0165556 A1* | 6/2015 | Jones | B29C 64/153 |
| | | | 264/482 |
| 2015/0253487 A1* | 9/2015 | Nichol | G02B 6/0036 |
| | | | 362/610 |
| 2015/0333473 A1* | 11/2015 | Gapontsev | H01S 3/0675 |
| | | | 372/3 |
| 2016/0067780 A1 | 3/2016 | Nuburu | |
| 2016/0067827 A1 | 3/2016 | Nuburu | |
| 2016/0322777 A1 | 11/2016 | Nuburu | |
| 2017/0021454 A1 | 1/2017 | Dallarosa et al. | |
| 2017/0021455 A1 | 1/2017 | Dallarosa | |
| 2017/0341144 A1 | 11/2017 | Nuburu | |
| 2017/0341180 A1 | 11/2017 | Nuburu | |
| 2017/0343729 A1 | 11/2017 | Nuburu | |
| 2018/0236605 A1 | 8/2018 | Finuf et al. | |
| 2018/0375296 A1 | 12/2018 | Nuburu | |
| 2019/0025502 A1 | 1/2019 | Nuburu | |
| 2019/0089983 A1 | 5/2019 | Nuburu | |
| 2019/0273365 A1 | 9/2019 | Nuburu | |
| 2019/0361171 A1 | 11/2019 | Nuburu | |
| 2020/0086388 A1 | 3/2020 | Nuburu | |
| 2020/0094478 A1 | 3/2020 | Nuburu | |
| 2020/0206844 A1 | 7/2020 | Nuburu | |
| 2020/0376764 A1 | 12/2020 | Nuburu | |
| 2021/0057865 A1 | 2/2021 | Nuburu | |
| 2021/0323071 A1 | 10/2021 | Nuburu | |
| 2021/0399519 A1 | 12/2021 | Nuburu | |
| 2022/0072659 A1 | 3/2022 | Nuburu | |

FOREIGN PATENT DOCUMENTS

| | | |
|---|---|---|
| EP | 1437882 | 7/2004 |
| EP | 3307525 | 4/2018 |
| EP | 3307526 | 4/2018 |

(56) References Cited

FOREIGN PATENT DOCUMENTS

| | | |
|---|---|---|
| JP | 6225263 | 6/2015 |
| KR | 1020180017080 A | 12/2016 |
| KR | 1020180017081 A | 12/2016 |
| KR | 10-2018-703763 | 8/2019 |
| WO | PCT/US2014/035928 | 8/2014 |
| WO | WO 2015134075 | 9/2014 |
| WO | WO 2014/179345 | 11/2014 |
| WO | PCT/US2015/047226 | 8/2015 |
| WO | PCT/US2016/042363 | 12/2016 |
| WO | WO 2016201309 | 12/2016 |
| WO | WO 2016201326 | 12/2016 |
| WO | PCT/US2017/030175 | 7/2017 |
| WO | PCT/US2017/030059 | 12/2017 |
| WO | PCT/US2017/030088 | 12/2017 |
| WO | PCT/2018/016119 | 4/2018 |
| WO | PCT/US2018/028698 | 7/2018 |
| WO | PCT/US2019/068996 | 5/2020 |
| WO | WO 2020/160540 | 8/2020 |
| WO | WO 2021/252694 | 12/2021 |

OTHER PUBLICATIONS

1998, Dongping Shi, Surface Finishing of Selective Laser Sintering Parts w/ Robot.
Aug. 18, 2017, Johannes Trapp, In situ absorptivity measurements of metallic powders during laser powder-bed fusion additive manufacturing.
Dec. 1, 2006, GSI, CRS Series—Resonant Optical Scanners.
2009, Newport Corporation, Workstation for Laser Direct-Write Processing 39.
2004, 3D Systems Inc, Sinterstation HIQ Series—SLS Systems Brochure.
2003, Raymond M. Karam, A New 3D, Direct Write, Sub-Micron Microfabrication Process that Achieves True Optical, Mechatronic and Packaging Integration on Glass-Ceramic Substrates.
2010, 3D Systems Inc, iPro 8000 & 9000 Brpchure.
2002, J. A. Ramos, Surface Over-Melt during Laser Polishing of Indiect—SLS Metal Parts.
2012, 3D Systems Inc, sPro 125 and sPro 250—Direct Metal SLM Production Printer.
2012, 3D Systems Inc, sPro Family Brochure.
2001, J.A. Ramos, Surface Roughness Enhancement of Indirect-SL5 Metal Parts by Laser Surface Polishing.
1993, William T. Carter, Direct Laser Sintering of Materials.
2012, Object Ltd., 10 Reasons Why Multi-Material 3D Printing is Better for your Product Design & Development.
Nov. 2012, Concept Laser, X line 100R—Metal laser Melting System.
Nov. 13, 2014, Fraunhofer ILT, Selective Laser Melting Press Relealse.
Sep. 21, 2017, 3D Print.com, Nuburu blue laser system.
2016, Wave Spectrum Laser, Inc, 405nm 6W Laser System.
2016, Wave Spectrum Laser, Inc, Package—High Power L—650 nm LD 1000mW High Power—C Mount Package Laser Diodes.
Aug. 2005, Larry Johnson, Laser Diode Burn-In and Reliability Testing.
Nov. 17, 2012, Nobuyasu Suzuki, 10 W CW blue-violet diode laser array on the micro-channel cooler.
2016, Crysta Laser, Diode pumped 473 nm blue Crysta Laser.
2014, Coherent, Inc, HighLight 1000FL—1kW Industrial OEM Fiber Laser.
2007, Chong Cook Kim, Degradation Modes of inGaN Blue-Violet Laser Diodes—Grown on Bulk GaN Wafers.
2013, Andreas Unger, High-power fiber-coupled 100 W visible spectrum diode lasers for display applications.
2016, DILAS Industrial Laser Systems, COMPACT (Blue) Diode Laser.
2016, Crysta Laser, Stabilized 375/405/445/456/473/390—488nm Violet-blue Lasers.
2013, C. P. Gonschior, High power 405 nm diode laserfiber-coupled single-made system with high long-term stability.
2013, Torrey Hills Technologies, LLC, Understanding of Laser, Laser diodes, Laser diode packaging and it's relationship to Tungsten Copper.
Mar. 15, 1996, Helms, Life tests of Nichia AlGaN/InGaN/GaN blue-light-emitting diodes (Sandia National Laboratories).
Sep. 3, 1997, Melanie Ott, Capabilities and Reliability of LEDs and Laser Diodes.
2008, nLight, Single Emitter Diode Laser Devices (Visible).
Jan. 2000, Shuji Nakamura, Current Status and Future prospects of InGaN-Based Laser Diodes.
Jan. 2012, IPG Photogenics, YLM Fiber Laser—Single Mode Series.
2004, François Gonthier, High-power All-fiber com ponents: The missing link for high power fiber lasers.
May/Jun. 2007, Thomas H. Loftus, Spectrally Beam-Combined Fiber Lasers for High-Average—Power Applications.
2010, Christophe A. Codemard, 100 W CW Cladding-Pumped Raman Fiber Laser at 1120 NM.
2007, Nathan B. Terry, Raman Fiber Lasers and Amplifiers Based on Multimode Graded-Index Fibers and Their Application to Beam Cleanup.
Jun. 1997, I. K. Ilev, Ultraviolet and blue discretely tunable-pass fiber Raman laser.
2004, Qin, Blue Up-Conversion Fibre Laser Pumped by a 1120-nm Raman Laser.
Jun. 24, 2010, John E. Heebner, High Brightness, quantum-defect—limited conversion efficiency in cladding-pumped Raman fiber amplifiers and oscilators.
2015, Huawei Jiang, Cascaded-cladding-pumped cascaded Raman fiber amplifier.
Feb. 2007, Christophe Andre Codemard, High-Power Cladding-Pumped Raman and Erbium-Ytterbium Doped Fibre Solutions.
1942, CV Raman, The Physcis of the Diamond.
Aug. 2011, Ondrej Kitzler, CW Diamond laser architecture for high average power raman beam conversion.
Oct. 1, 2014, N. V. Surovtsev, Temperature Dependence of the Raman line width in diamond: Revisited.
2012, Vasili G. Savitski, Steady-State Raman Gain in Diamond as a Function of Pump Wavelength.
2011, Jean-Philippe M. Feve, High average power diamond Raman laser.
Nov. 20, 2015, Tianfu Yao, High-power Continuous-Wave Directly-Diode-Pumped Fiber Raman Lasers.
Jun. 1, 2008, Arman B. Fallahkhair, Vectore Finite Difference Modesolver for Anisoptropic Dielectric Waveguides.
Jan. 2011, Jean-philippe Feve, High average power diamond Raman laser.
Jan. 2016, Ekaterina A. Zlobina, Singlemode Raman Lasing in Graded-Index Fiber Pumped by High-Power 915-nm Laser Diode.
Jun. 2016, Yaakov Glick, High power, high efficiency diode pumped Raman fiber laser.
Nov. 2015, Yao, High-Power Continuous-Wave Directly-Diode-Pumped Fiber Raman Lasers.
2004, R.P. Mildren, Efficient, all-solid-state, Raman laser in the yellow, orange, and red.
Nov. 11, 1992, Katsuske Tajima, Low Rayleigh Scattering P2 O5—F—Si O2 Glasses.
Aug. 1, 1976, K. O. Hill, Low-threshold cw Raman laser.
Jan. 2017, Ekaterina A. Zlobina, graded-index fiber directly pumped by a multimode laser diode.
Nov. 18, 2003, Shenghong Huang, Generation of 10.5 W 1178 nm Laser Based on Phosphosilicate Raman Fiber Laser.
Aug. 10, 2015, Hongxin Su, Investegation of Stimulated Raman Scattering in a Phosphorus-doped silica fiber.
2017, Aaron McKay, Diamond-based Concept for combining beams at very high average powers.
Jun. 1997, I. K. Ilev, Ultraviolet and blue discretely tunable double-pass: fiber Raman laser.
Nov. 7, 2004, V. A. Lisinetskii, Raman Gain Coefficient of Barium Nitrate Measured for the Spectral Region of TI: Sapphire Laser.

(56) References Cited

OTHER PUBLICATIONS

Dec. 2003, Nathan R. Newbury, Pump-Wavelength Dependence of Raman Gain in Single-Mode Optical Fibers.
Jan. 1, 2014, CPT, Reduced Mode Sapphire Optical Fiber and Sensing System.
Jul. 15, 2002, N. R. Newbury, Rman gain: pump-wavelength dependence in single-mode fiber.
Jan. 2016, Ekaterina A. Zlobina, Raman Lasing in GRIN Fibers with 915-nm Diode Pumping.
May/Jun. 2002, Mohammed N. Islam, Raman Amplifiers for Telecommunications.
Aug. 2005, A. Martínez Rios, Analytical approach for the design of cascaded raman fiber lasers.
Nov. 11, 2000, Kyozo Tsujikawa, Rayleigh Scattering Reduction Method for Silica-Based Optical Fiber.
2005, Clara Rivero, Resolved discrepancies between visible Spontaneous Raman cross-Section and direct near-infrared Raman gain measurements in TeO2-.
Aug. 20, 1997, Rick K. Nubling, Optical properties of single-crystal sapphire fibers.
2014, Yves Colombe, Single-mode Optical fiber for high-power, low-loss UV transmission.
Jan. 2015, David J Spence, Spatial and Spectral Effects in Continuous Wave Intracavity Raman Lasers.
Apr. 2014, Bonner, Spectral broadening in Continuous-wave intracavity Raman lasers.
May 30, 2013, A. A. Lanin, The phase-controlled Raman effect.
2006, Robert Anthony Michael Stegeman, Direct Nonlinear Optics Measurements of Raman Gain in Bulk Glasses And Estimates of Fiber Performanc.
2007, Nathan B. Terry, graded-index multimode fiber for SRS beam combinaton.
May 15, 2005, V. G. Plotnichenko, Raman band intensities of tellurite glasses.
Nov. 23, 2000, P.A. Champert, Tunable, broad visible Range, fibre-based Raman Source.
Apr. 2012, Christian Agger, Supercontinuum generation in ZBLAN fibers—detailed comparison between measuremnt and simulation.
1997, Keming Du, Fiber-coupling technique with micro step-mirros for high-power diode laser bars.
1999, C.C. Cook, Spectral Beam Combing of Yb-doped Fiber Lasers in an External Cavity.
Aug. 1977, W. J. Tomlinson, Wavelength multiplexing in multimode optical fibers.
1996, Shih-Hsiang Hsu, External Cavity Laser Array with Monolithically Integrated Glass Waveguide and Rowland Circle.
1999, Jason N. Farmer, Incoherent Beam Combination of Diode Laser Bars.
1998, H.G. Treusch, Fiber-Coupling technique for high-power diode laser arrays.
2012, Y. Xiao, 1-Kilowatt CW all-fiber laser oscillator pumped with wavelength-beam-combined diode stacks.
Feb. 15, 2007, Robin K. Huang, High-Brightness Wavelength Beam Combined Semiconductor Laser Diode Arrays.
May/Jun. 2005, T. Y. Fan, Laser Beam Combining for High-Power, High-Radiance Sources.
2006, B. Chann, High-Brighness Wavelength-Beam-Combined Diode Laser Stcks Using a Volume Bragg Grating (VBG).
May 2002, Erik J. Bochove, Theory of Spectral Beam Combining of Fiber Lasers.
2001, A.K. Goyal, Wavelength Beam Combining of Mid-IR Semiconductor Lasers.
Mar./Apr. 2009, Oleksiy Andrusyak, Spectral Combining and Coherent coupling of Lasers by Volume Bragg Gratings.
Apr. 2005, Dennis Lowenthal, Across the Spectrum: Combining laser emitters yields a high-power source with a useful beam.
Jun. 18, 2003, Steven C. Tidwell, Spectral beam combining of diode laser bars achieve effiecient near diffraction limited output power (Abstract only).
Jun. 1, 2004, Charles E. Hamilton, High-power laser source with spectrally beam-combined diode laser bars (abstract only).
2011, Sims, Spectral beam combining of 2 um Tm fiber laser systems.
2009, Lee, Benjamin G, Wavelength beam combining of quantum cascade laser arrays for remote sensing.
1999, C.C. Cook, Spectral Beam Combining of Yb-doped Fiber Lasers in External Cavity.
2007, Oleksiy Andrusyak, Power Scaling of Laser Systems Using Spectral Beam Combining with Volume Bragg Gratings in PTR Glass.
1988, David L. Begley, Aperture Shared Laser diode array beam combiner.
1999, Jason N. Farmer, 50 x improvement in diode beam quality.
2008, Juliet T. Gopinath, 1450-nm high-brightness wavelength-beam combined diode laser array.
1993, G. C. Papen, Multiple-wavelength operation of a laser-diode array coupled to an external cavity.
1997, H. Tanobe, OFC '97 Technical Digest—A four-channel multiwavelengthfibergrating external-cavity-laser.
1997, Martin Zirngibl, OFC '97 Technical Digest—Multiple wavelength sources, detectors, and routers.
Aug. 1977, W. J. Tomlinson, Wavelength multiplexing in multimocle optical fibers.
Nov. 23, 2014, Jeff Hecht, Photonic Frontiers: beam combining.
2007, Oleksiy Andrusyak, Power Scaling of Laser Systems Using Spectral Beam Combining with Volue Bragg Gratings in PTR Glass.
2011, R. Andrew Sims, Spectral beam combining of 2 um Tm fiber laser systems.
Feb. 2010, R. Andrew Sims, Spectral beam combining of thulim fiber laser systems (abstract only).
Apr. 20, 1987, Chandrasekhar Roychoudhuri, Laser Beam Combining Technology (abstract only).
Jan./Feb. 2001, Shu Namiki, Ultrabroad-Band Raman Amplifiers Pumped and Gain-Equalized by Wavelength-Division-.

\* cited by examiner

METHODS AND SYSTEMS FOR WELDING COPPER AND OTHER METALS USING BLUE LASERS

This application: (i) claims under 35 U.S.C. § 119(e)(1) the benefit of the filing date of U.S. provisional application Ser. No. 62/786,511 filed Dec. 30, 2018; (ii) is a continuation-in-part of U.S. patent application Ser. No. 15/884,672 filed Jan. 31, 2018 which claims under 35 U.S.C. § 119(e)(1) the benefit of the filing date of U.S. provisional application Ser. No. 62/452,598 filed Jan. 31, 2017; and (iii) is a continuation-in-part of U.S. patent application Ser. No. 15/581,928 filed Apr. 28, 2017 which claims under 35 U.S.C. § 119(e)(1) the benefit of the filing date of U.S. provisional application Ser. No. 62/329,830 filed Apr. 26, 2016, the entire disclosure of each of which is incorporated herein by reference.

BACKGROUND OF THE INVENTION

Field of the Invention

The present inventions relate to laser processing of materials, and in particular laser joining of copper materials using laser beams having wavelengths from about 350 nm to about 500 nm, and greater.

Laser welding of copper has proven to be very challenging due to high reflectivity, high thermal conductivity and high heat capacity. Numerous methods have been developed to weld copper ranging from ultrasonic welding to IR laser welding. These prior copper welding methods, however, have many shortcomings and limitations. For example, one market where these limitations are seen is in the area of high performance electronics for the growing electronic vehicle market. A better weld quality with higher speed, than can be obtained by these prior techniques, is needed to produce high performance batteries and electronics for the growing automotive markets.

When using an IR laser source at 1030 nm, the high reflectivity of the copper at this wavelength makes it difficult to couple power into the material to heat and weld it. One method to overcome the high reflectivity is to use a high-power level (>1 kW) IR laser to initiate a keyhole weld which then couples the power into the material. The problems with this method of welding, among other things, is that the vapor in the keyhole can lead to a micro-explosion, spraying molten copper all over the parts being welded or the micro-explosion can cause a hole completely through the parts being welded. Consequently, researchers have had to rely on rapidly modulating the laser power to try to prevent these defects during welding. It has been discovered that the defects are a direct result of the process itself, as the laser attempts to weld the copper, it initially heats it up to the melting point and then it rapidly transitions into vaporizing the copper. Once the copper vaporizes the keyhole is formed and the laser coupling rises rapidly from the initial 5% to 100%, this transition occurs so rapidly that the amount of heat coupled in rapidly exceeds the amount of heat needed to weld the parts, resulting in the micro-explosion described.

Laser welding of copper with current infrared lasers method and systems is challenging, and has problems, due to the high reflectivity, high thermal conductivity, low vaporization points and high heat capacity. Numerous methods have been attempted to weld copper with IR lasers ranging from combining the IR laser with a green laser, wobbling the spot in the weld puddle, operating in a vacuum and modulating the laser at a high frequency. While these approaches are currently in use for some copper welding applications, they tend to have narrow processing windows, uncontrolled spatter, and unpredictable variability in the welds, and have generally proved to be less than desirable or optimal. One of the more difficult copper welding process is the how to weld stacks of copper foil to each other and to thicker bus bars. Today, this cannot be done with an IR laser reliably or in a manner that produces the weld qualities that are needed by manufactures. Thus, manufacturers have relied on ultrasonic welding methods to bond these foils together. These ultrasonic methods are also less than optimal and are problematic. For example, with ultrasonic welding methods, the sonotrodes can wear during production resulting in process variabilities ranging from incomplete welds to welds with debris left behind. These deficiencies limit the manufacturing yield, the internal resistance of batteries, the energy density of the resulting batteries and in many cases the reliability of the batteries.

The term "copper based material" unless expressly provided otherwise, should be given it broadest possible meaning and would include copper, copper materials, copper metal, materials electroplated with copper, metallic materials that contain from at least about 10% copper by weight to 100% copper, metals and alloys containing from at least about 10% copper by weight to 100% copper by weight, metals and alloys containing from at least about 20% copper by weight to 100% copper by weight, metals and alloys containing from at least about 10% copper by weight to 100% copper by weight, metals and alloys containing from at least about 50% copper by weight to 100% copper by weight, metals and alloys containing from at least about 70% copper by weight to 100% copper by weight, and metals and alloys containing from at least about 90% copper by weight to 100% copper by weight.

The terms "laser processing, "laser processing of materials," and similar such terms, unless expressly provided otherwise, should be given there broadest possible meaning and would include welding, soldering, smelting, joining, annealing, softening, tackifying, resurfacing, peening, thermally treating, fusing, sealing, and stacking.

As used herein, unless expressly stated otherwise, "UV", "ultra violet", "UV spectrum", and "UV portion of the spectrum" and similar terms, should be given their broadest meaning, and would include light in the wavelengths of from about 10 nm to about 400 nm, and from 10 nm to 400 nm.

As used herein, unless expressly stated otherwise, the terms "visible", "visible spectrum", and "visible portion of the spectrum" and similar terms, should be given their broadest meaning, and would include light in the wavelengths of from about 380 nm to about 750 nm, and 400 nm to 700 nm.

As used herein, unless expressly stated otherwise, the terms "blue laser beams", "blue lasers" and "blue" should be given their broadest meaning, and in general refer to systems that provide laser beams, laser beams, laser sources, e.g., lasers and diodes lasers, that provide, e.g., propagate, a laser beam, or light having a wavelength from about 400 nm to about 500 nm. Typical blue lasers have wavelengths in the range of about 405-495 nm. Blue lasers include wavelengths of 450 nm, of about 450 nm, of 460 nm, of about 470 nm. Blue lasers can have bandwidths of from about 10 pm (picometer) to about 10 nm, about 5 nm, about 10 nm and about 20 nm, as well as greater and smaller values.

As used herein, unless expressly stated otherwise, the terms "green laser beams", "green lasers" and "green" should be given their broadest meaning, and in general refer to systems that provide laser beams, laser beams, laser sources, e.g., lasers and diodes lasers, that provide, e.g., propagate, a laser beam, or light having a wavelength from about 500 nm to about 575 nm. Green lasers include wavelengths of 515 nm, of about 515 nm, of 532 nm, about 532 nm, of 550 nm, and of about 550 nm. Green lasers can have bandwidths of from about 10 pm to 10 nm, about 5 nm, about 10 nm and about 20 nm, as well as greater and smaller values.

As used herein, unless expressly stated otherwise terms such as "at least", "greater than", also mean "not less than", i.e., such terms exclude lower values unless expressly stated otherwise.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard temperature and pressure.

Generally, the term "about" and the symbol "~" as used herein, unless specified otherwise, are meant to encompass a variance or range of ±10%, the experimental or instrument error associated with obtaining the stated value, and preferably the larger of these.

As used herein, unless specified otherwise, the recitation of ranges of values, a range, from about "x" to about "y", and similar such terms and quantifications, serve as merely shorthand methods of referring individually to separate values within the range. Thus, they include each item, feature, value, amount or quantity falling within that range. As used herein, unless specified otherwise, each and all individual points within a range are incorporated into this specification, and are a part of this specification, as if they were individually recited herein.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

There is a continuing and increasing need for better weld quality, higher speed welds, as well as, greater reproducibility, reliability, higher tolerances and more robustness in the welding of metals and, in particular, the welding of copper metals for electronic components and batteries. Included in these needs, there is the need for an improved method for welding copper to itself and other metals; and, there is a need to address the issues associated with welding stacks of copper foils and these stacks to thicker copper or aluminum parts. The present inventions, among other things, solve these needs by providing the improvements, articles of manufacture, devices and processes taught, and disclosed herein.

Thus, there is provided a system for and a method of laser welding a plurality of cooper foils together, the method including the steps of: positioning a plurality of pieces of cooper foil in a welding stand; wherein the foil contains at least about 50% cooper; exerting a clamping force on the plurality of pieces of cooper foil to clamp the pieces of foil together in the welding stand; directing a blue laser beam along a laser beam path at the plurality of pieces of cooper foil, wherein the laser beam has the following properties: (i) at least 500 Watts of power; (ii) a beam parameter product of about 44 mm mrad and less; (iii) a spot size of about 400 µm and less; (iv) an average intensity of at least of about 400 kW/cm$^2$; (v) a peak intensity of at least about 800 kW/cm$^2$; and the blue laser beam lap welding the plurality of pieces of cooper foil together at a welding speed; and, providing a non-oxidizing beam clearing gas in a space along the laser beam path where the laser beam travels in free space from an optical element to the plurality of pieces of cooper foil; wherein clearing gas removes plume material from the laser beam path and prevents oxidation of the plurality of pieces of cooper foil; wherein the welding speed, clamping force, and a flow rate of the non-oxidizing clearing glass, are predetermined to thereby provide a lap weld having no visible splatter and no visible porosity.

Additionally, there is provided these welds, laser systems and welding methods have one or more of the following features: wherein the beam is a CW beam; wherein the beam is a pulsed beam; wherein the beam has a wavelength of about 450 nm; wherein the optical element is selected from the group consisting of a lens, a fiber face, and a window; wherein the clearing gas is selected from the group consisting of Argon, Argon-CO$_2$, Air, Helium and Nitrogen; wherein the laser beam is not wobbled; thereby providing a wobble free laser welding process; wherein the plurality of pieces of cooper foil has from 10 to 50 pieces of foil; wherein a cooper foil piece has a thickness of from about 80 µm to 500 µm; wherein each of the plurality of pieces of cooper foil has a thickness of from about 80 µm to 500 µm; and, wherein the welding speed is at least 10 m/min.

Further, there is provided a system for and a method of laser welding a plurality of metal pieces together, the method including: positioning a plurality of pieces of a metal in a welding stand; exerting a clamping force on the plurality of pieces of metal to clamp the pieces of metal together in the welding stand; directing a blue laser beam along a laser beam path at the plurality of pieces of metal, wherein the laser beam has the following properties: (i) at least 500 Watts of power; (ii) a beam parameter product of about 44 mm mrad and less; (iii) a spot size of about 400 µm or less; (iv) an average intensity at least of about 400 kW/cm$^2$; (v) a peak intensity of at least about 800 kW/cm$^2$; and, the blue laser beam welding the plurality of pieces of metal together at a welding speed; and, providing a non-oxidizing beam clearing gas in a space along the laser beam path where the laser beam travels in free space from an optical element to the plurality of pieces of cooper foil; wherein clearing gas removes plume material from the laser beam path and prevents oxidation of the plurality of pieces of cooper foil; wherein the welding speed, clamping force, and a flow rate of the non-oxidizing clearing glass, are predetermined to thereby provide a weld having no visible splatter and no visible porosity.

Still further there is provided these welds, laser systems and welding methods have one or more of the following features: wherein the welding stand has an air gap below the pieces of metal; wherein the metal is selected from the group consisting of aluminum, Stainless Steel, copper, aluminum based metals, Stainless Steel based metals, copper based metals, aluminum alloys, Stainless Steel alloys and cooper alloys; wherein the laser beam has a wavelength of about 450 nm; wherein the laser beam is not wobbled, thereby providing a wobble free laser welding process; and, wherein the weld is selected from the group of welds consisting of a lap weld, a butt weld, bead on plate weld and a conduction mode weld.

Moreover, there is provided a system for and a method of laser welding a plurality of cooper foils together, the method including: positioning a plurality of pieces of cooper foil in a welding stand; wherein the foil contains at least about 50% cooper; wherein the cooper foil has a thickness of from about 80 µm to 500 µm; exerting a clamping force on the plurality of pieces of cooper foil to clamp the pieces of foil together in the welding stand; directing a blue laser beam along a laser beam path at the plurality of pieces of cooper foil, wherein the laser beam has the following properties: (i) at least 600 Watts of power; (ii) a beam parameter product of about 44 mm mrad and less; (iii) a spot size of about 200 µm to about 400 µm; (iv) an average intensity at least of about 2.1 MW/cm$^2$; (v) a peak intensity approaching at least about 4.5 MW/cm$^2$; the blue laser beam welding the plurality of pieces of metal together at a welding speed of at least 10 m/min; and, providing a non-oxidizing beam clearing gas in a space along the laser beam path where the laser beam travels in free space from an optical element to the plurality of pieces of cooper foil; wherein clearing gas removes plume material from the laser beam path and prevents oxidation of the plurality of pieces of cooper foil; wherein the welding speed, clamping force, and a flow rate of the non-oxidizing clearing glass, are predetermined to thereby provide a weld having no visible splatter and no visible porosity.

There is provided a method of forming a perfect weld in copper based materials, the method including: placing a work piece in a laser system; wherein the work piece includes placing a first piece of copper based material in contact with a second piece of copper material; directing a blue laser beam at the work piece, whereby a weld is formed between the first piece of copper based material and the second piece of copper based material; wherein the weld includes a HAZ and a resolidification zone; wherein a microstructure of the copper based material, the HAZ and the resolidification zone are identical.

There is further provided these welds, systems and methods having one or more of the following systems; wherein the identical microstructures shows no discernable difference in the weld that would indicate a weakness in the weld; wherein the identical microstructure includes crystal growth regions of similar size; wherein the weld is formed by conduction mode welding; wherein the weld is formed by keyhole mode welding; wherein the first and second pieces have a thickness of from about 10 µm to about 500 µm; wherein the first piece includes a plurality of layers of copper foil; wherein the first piece is copper metal; wherein the first piece is a copper alloy, having from about 10 to about 95 weight percent copper; wherein the laser beam is directed to the work piece as a focused spot having power density is less than 800 kW/cm$^2$; wherein the laser beam is directed to the work piece as a focused spot having power density of is less than 500 kW/cm$^2$; wherein the laser beam is directed to the work piece as a focused spot having power density from about 100 kW/cm$^2$ to about 800 kW/cm$^2$; wherein the laser beam is directed to the work piece as a focused spot having power density is greater than 100 kW/cm$^2$; wherein the laser beam has a power of less than 500 W; wherein the laser beam has a power of less than 275 W; wherein the laser beam has a power of less than 150 W; wherein the laser beam has a power in the range of 150 W to about 750 W; wherein the laser beam has a power in the range of about 200 W to about 500 W; wherein the laser beam is directed to the work piece as a focused spot having spot size of from about 50 µm to about 250 µm; wherein the laser beam has a wavelength from about 405 nm to about 500 nm; wherein the weld is formed is splatter free; and, wherein the laser does not vaporize the workpiece.

Still further there is provided a method of forming a perfect weld in copper based materials, the method including: placing a work piece in a laser system; wherein the work piece includes placing a first piece of copper based material in contact with a second piece of copper material; directing a blue laser beam at the work piece, whereby a weld is formed between the first piece of copper based material and the second piece of copper based material; wherein the weld includes a HAZ and a resolidification zone; wherein a range of hardness for the HAZ is within a range of hardness for the copper based material.

Yet additionally, there is provided these welds, systems and methods having one or more of the following features: wherein the range of hardness for the resolidification zone is within a range of hardness for the copper based material; wherein a microstructure of the copper based material, the HAZ and the resolidification zone are identical; wherein the identical microstructures show no discernable difference in the weld that would indicate a weakness in the weld; wherein the identical microstructures shows no discernable difference in the weld that would indicate a weakness in the weld; and wherein the identical microstructure includes crystal growth regions of similar size.

Further there is provided a method of forming a perfect weld in copper based materials, the method including: placing a work piece in a laser system; wherein the work piece includes placing a first piece of copper based material in contact with a second piece of copper material; directing a blue laser beam at the work piece, whereby a weld is formed between the first piece of copper based material and the second piece of copper based material; wherein the weld includes a HAZ and a resolidification zone; wherein a range of hardness for the resolidification zone is within a range of hardness for the cooper based material.

Further there is provided welding copper with a blue laser with a wavelength range of 405 nm to 500 nm, and the welds and products that are produced by this welding.

Moreover there is provided these welds, methods and systems that include one or more of the following features: wherein welding copper in a conduction mode; welding copper in a conduction mode with no vaporization of the weld puddle during the welding process; welding copper in a conduction mode producing a micro-structure similar to the base metal with crystal growth regions that are similar in size to the base material; welding copper as in a conduction mode producing a micro-structure similar to the base metal in the Heat Affected Zone (HAZ); welding copper in a conduction mode producing a micro-structure similar to the base metal in the weld bead; welding copper in a conduction mode producing a hardness similar to the base metal in the Heat Affect Zone; welding copper in a conduction mode producing a harness similar to the base metal in the weld bead; welding copper where the micro-structure in the weld is different from the base metal; welding copper where the micro-structure in the HAZ is similar to the base metal.

Moreover there is provided these welds, methods and systems that include one or more of the following features: welding copper in a keyhole mode; welding copper in a keyhole mode where very low spatter occurs during the weld and little or no spatter is observed on the surface of the copper after the weld; welding copper with a power density of 500 kW/cm$^2$ or greater and a weld speed that enables the keyhole to remain open; welding copper with a power density of 400 kW/cm$^2$ or greater and a weld speed that enables the keyhole to remain open; welding copper with a power density of 100 kW/cm$^2$ or greater and a weld speed that is sufficiently fast to prevent the transition to the keyhole welding regime; welding copper with a pre-heat to improve the penetration depth during the weld; welding copper with an Ar—CO₂ assist gas; welding copper with an Ar—H₂ assist gas; welding copper with Ar assist gas; welding copper with air; welding copper with He assist gas; welding copper with N₂ assist gas; and welding copper with an assist gas.

Moreover there is provided these welds, methods and systems that include one or more of the following features: the laser power is modulated from 1 Hz to 1 kHz; the laser power is modulated from 1 kHz to 50 kHz; using an elongated blue laser spot to keep the keyhole open; using a robot to rapidly move the spot in a circular, oscillatory or oblong oscillation motion; using a mirror mounted on a galvanometer to oscillate the spot parallel to the weld direction; using a mirror mounted on a galvanometer to oscillate the spot perpendicular to the weld direction; and using a pair of mirrors mounted on a pair of galvanometers to rapidly move the spot in a circular, oscillatory, or oblong oscillation motion.

Still additionally there is provided a method of forming a keyhole weld in copper based materials, the method including: placing a work piece in a laser system; wherein the work piece comprises placing a first piece of copper based material in contact with a second piece of copper material; and, directing a blue laser beam at the work piece, whereby a keyhole mode weld is formed between the first piece of copper based material and the second piece of copper based material; wherein the weld comprises a HAZ and a resolidification zone.

Moreover there is provided these welds, methods and systems that include one or more of the following features: wherein the laser power is less than 1000 kW for a keyhole weld; wherein the laser power is less than 500 kW for a keyhole weld; wherein the laser power is less than 300 kW for a keyhole weld; comprising elongating the laser beam to suppress spatter from the keyhole; comprising modulating the laser power to suppress spatter from the keyhole; comprising rapidly scanning the beam to suppress spatter during the keyhole mode of welding; comprising rapidly decreasing the laser power after the weld is initiated either automatically or manually; comprising using a low atmospheric pressure to reduce entrapped gases and spatter during the welding process; comprising applying a shielding gas; comprising applying a shielding gas selected from the group consisting of He, Ar, N₂ comprising applying a shielding gas mixture selected from the group consisting of Ar—H₂, N₂, N₂—H₂; and, comprising applying a shielding gas and adding hydrogen to the shielding gas to remove oxide layers and promote wetting of the weld.

DESCRIPTION OF THE PREFERRED EMBODIMENTS

Figure 1:
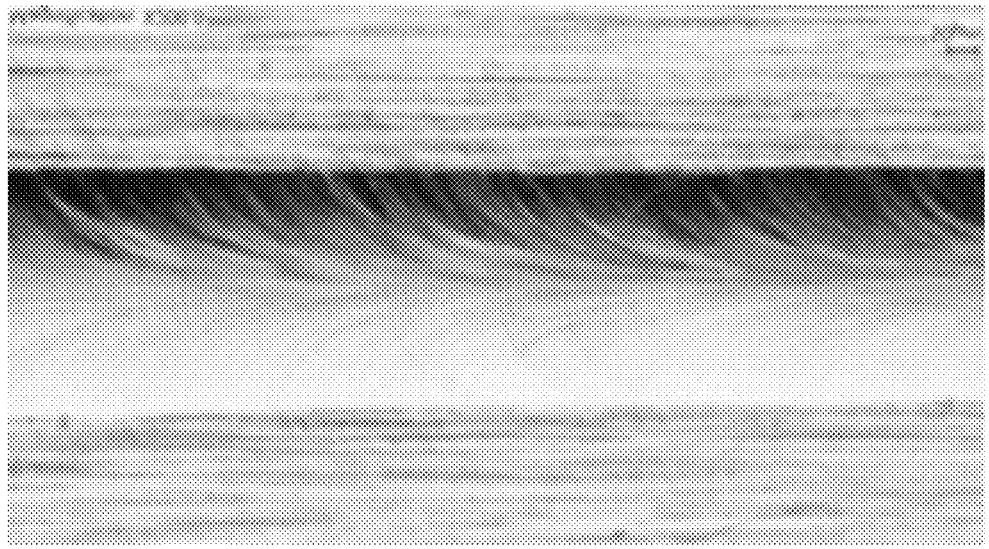
FIG. 1 is a photograph of an embodiment of a spatter-free conduction mode weld of copper in accordance with the present inventions.

In general, the present inventions relate to lasers, laser beams, systems and methods for welding metals, and in particular aluminum, stainless steel, copper, aluminum based metals, Stainless Steel based metals, copper based metals and alloys of these. Generally, the present inventions further relate to the method for the application of the laser beam, the beam size, the beam power, the method for holding the parts and the method for introducing the shielding gas to assist in the welding process, including to prevent oxidation of the part and managing of the plume to prevent plume interference with the laser beam.

In an embodiment, the present inventions provide high quality welds, high welding speeds, and both for copper based materials in many areas, including for electronic components, and further including batteries. In an embodiment, the present inventions provide high quality welds, high welding speeds, and both for copper based materials for automotive components, including automotive electronic components, including batteries.

In an embodiment, the present inventions provide high quality welds, high welding speeds, and both for stainless steel based materials in many areas, including for electronic components, and further including batteries. In an embodiment, the present inventions provide high quality welds, high welding speeds, and both for stainless steel based materials for automotive components, including automotive electronic components, including batteries.

In an embodiment, the present inventions provide high quality welds, high welding speeds, and both for aluminum based materials in many areas, including for electronic components, and further including batteries. In an embodiment, the present inventions provide high quality welds, high welding speeds, and both for aluminum based materials for automotive components, including automotive electronic components, including batteries.

In an embodiment of the present inventions, a high power blue laser source (e.g., ~450 nm) solves the problems with prior copper welding techniques. The blue laser source provides a blue laser beam, at this wavelength the absorption of copper is at ~65% enabling efficient coupling of the laser power into the material at all power levels. This system and method provides stable welding in many welding techniques, including the conduction and keyhole welding modes. This system and method minimizes, reduces and preferably eliminates, vaporization, spatter, micro explosions, and combinations and variations of these.

In an embodiment blue laser welding of copper at power levels ranging from 150 Watts to 275 Watts with a spot size of ~200 μm achieves stable, low spatter welding over all power ranges. In an embodiment of this welding system and method the welding is in the conduction mode with the resulting weld microstructure resembling the base material.

Preferably, in embodiments the laser wavelengths can be in wavelengths from 350 nm to 500 nm, the spot size (diameter, or cross section) can range from 100 microns (μm) to 3 mm, and larger spot sizes are also contemplated. The spot can be circular, elliptical, linear, square or other patterns. Preferably, the laser beam is continuous. In embodiments the laser beam can be pulsed, for example from about 1 microsecond and longer.

Figure 6:
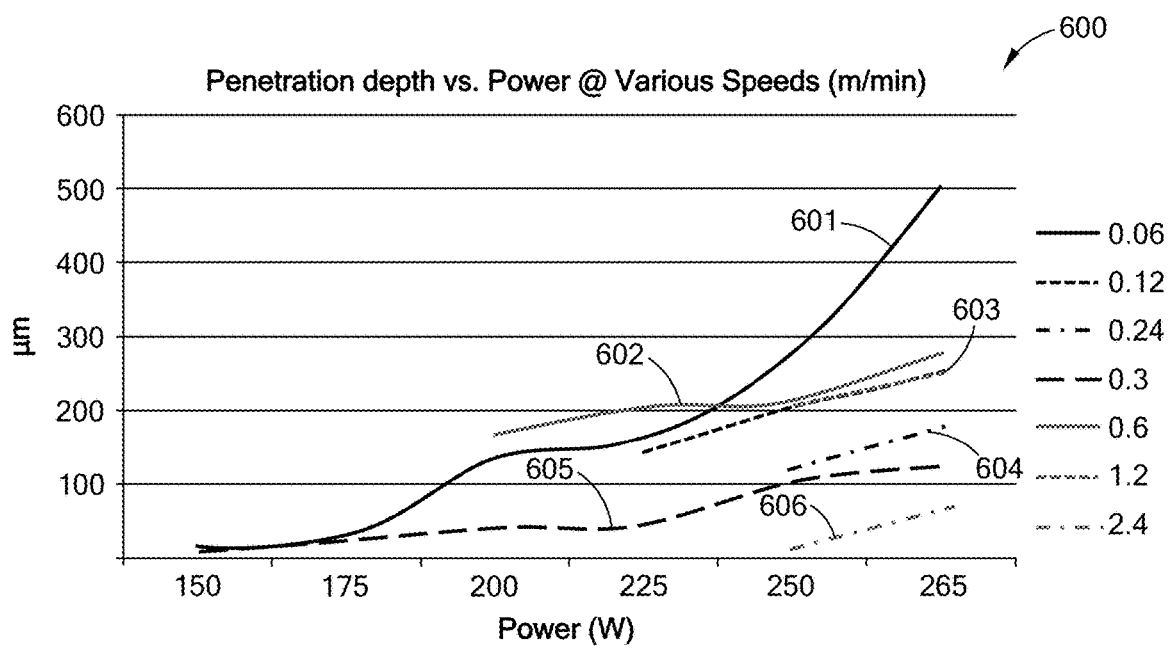
FIG. 6 is a chart showing penetration depth at several different speeds for embodiments of the present inventions.

Turning to FIG. 6 there is shown the penetration depth vs power at various welding speeds. The welds were performed using a system of the type described in Example 1. The welds were made on 500 μm Copper at 275 W power for the laser beam with no assist gas.

Figure 7:
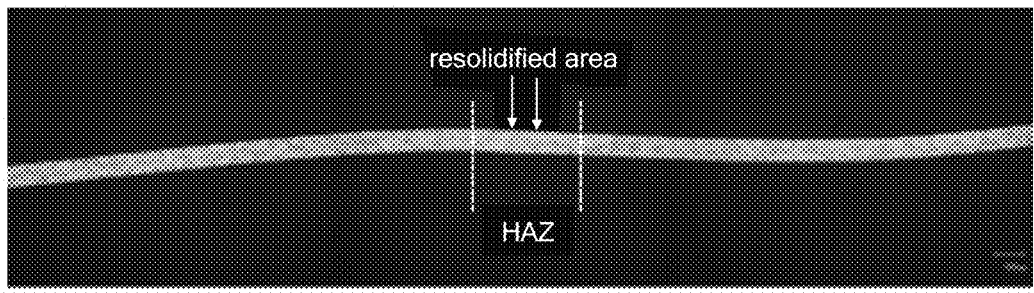
FIG. 7 is an annotated photograph showing an embodiment of a conduction mode weld on a 70 μm thick copper foil in accordance with the present inventions.

The photograph of FIG. 7 shows a conduction mode weld on a 70 μm thick copper foil showing the micro-structure through the HAZ and weld. The weld was made using the parameters described in Example 1. The depth of penetration of each sample was determined by first cross sectioning, then etching the sample to reveal the microstructure of the weld and HAZ areas. In addition, one of the samples was cross sectioned and the Vickers hardness across the base metal ranged from 133-141 HV, the weld bead was approximately 135 HV and the HAZ ranged from 118-132 HV. The conclusion is that hardness of the base material, HAZ and weld bead, e.g., resolidification zone, is close to the original material. In addition, the micro-structure for the conduction mode weld bead, the HAZ and the base material is very similar with minor differences in the microstructure. A weld with these characteristics has never been observed before in copper when welded with a laser or any other means. This weld quality is shown in FIG. 7 where the sample has been cross sectioned transverse to the weld and etched to reveal the microstructure.

Thus, there are embodiments of the present inventions include the method of welding copper based materials to obtain the following welds, and the resultant welds themselves. These methods and welds would include welding two or more copper based materials together, so that in the area around the weld the following the hardness of the material (as measured by a accepted and established hardness test, e.g., Vickers hardness, ASTM test, etc.) where the weld bead hardness is within the hardness of the base material, the weld bead hardness is within 1% of the hardness of the base materials, the weld bead hardness (e.g., resolidification zone) is within 5% of the hardness of the base materials, and the weld bead hardness is within 10% of the hardness of the base materials. These methods and welds would include welding two or more copper based materials together, so that in the area around the weld the following hardness of the material (as measured by a accepted and established hardness test, e.g., Vickers hardness, ASTM test, etc.) where the HAZ hardness is within the hardness of the base material, the HAZ hardness is within 1% of the hardness of the base materials, the HAZ hardness is within 5% of the hardness of the base materials and the HAZ hardness is within 10% of the hardness of the base materials. These methods and welds would include welding two or more copper based materials together, so that in the area around the weld the microstructure of the base material, the bead (e.g., the resolidification zone), and the HAZ are identical, i.e., there are no discernable difference in the microstructure that would suggest or shown a weakness in the welded structure in the area of the weld or a weakness in the area of the weld).

Figure 8:
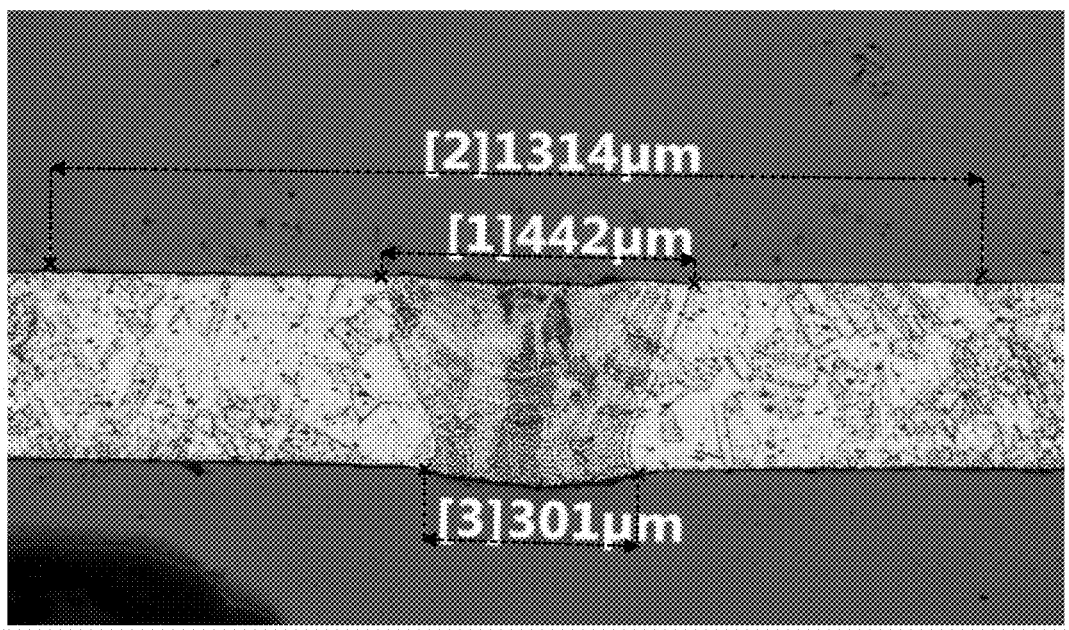
FIG. 8 is an annotated photograph of an embodiment of a keyhole mode weld cross section in accordance with the present inventions.

Turning to FIG. 8 is the microstructure observed for a sample of the 500 µm thick copper sheet when operating in the keyhole welding mode. During the keyhole welding process, a vapor plume was clearly visible and molten copper was slowly ejected along the length of the weld. There were no indications during the weld, or after the weld of spatter from the welding process as is usually observed when welding with an IR laser. This indicates a stable, well controlled keyhole process which is suitable for creating high quality welds on electrical components. The keyhole mode weld cross section, of very high quality and uniformity, of the type shown in FIG. 8, is obtainable for a power density, as low as 800 kW/cm² and lower. The resolidification area [1]-[2] was from 442 µm to 301 µm and the HAZ [2] was 1314 µm.

Figure 9:
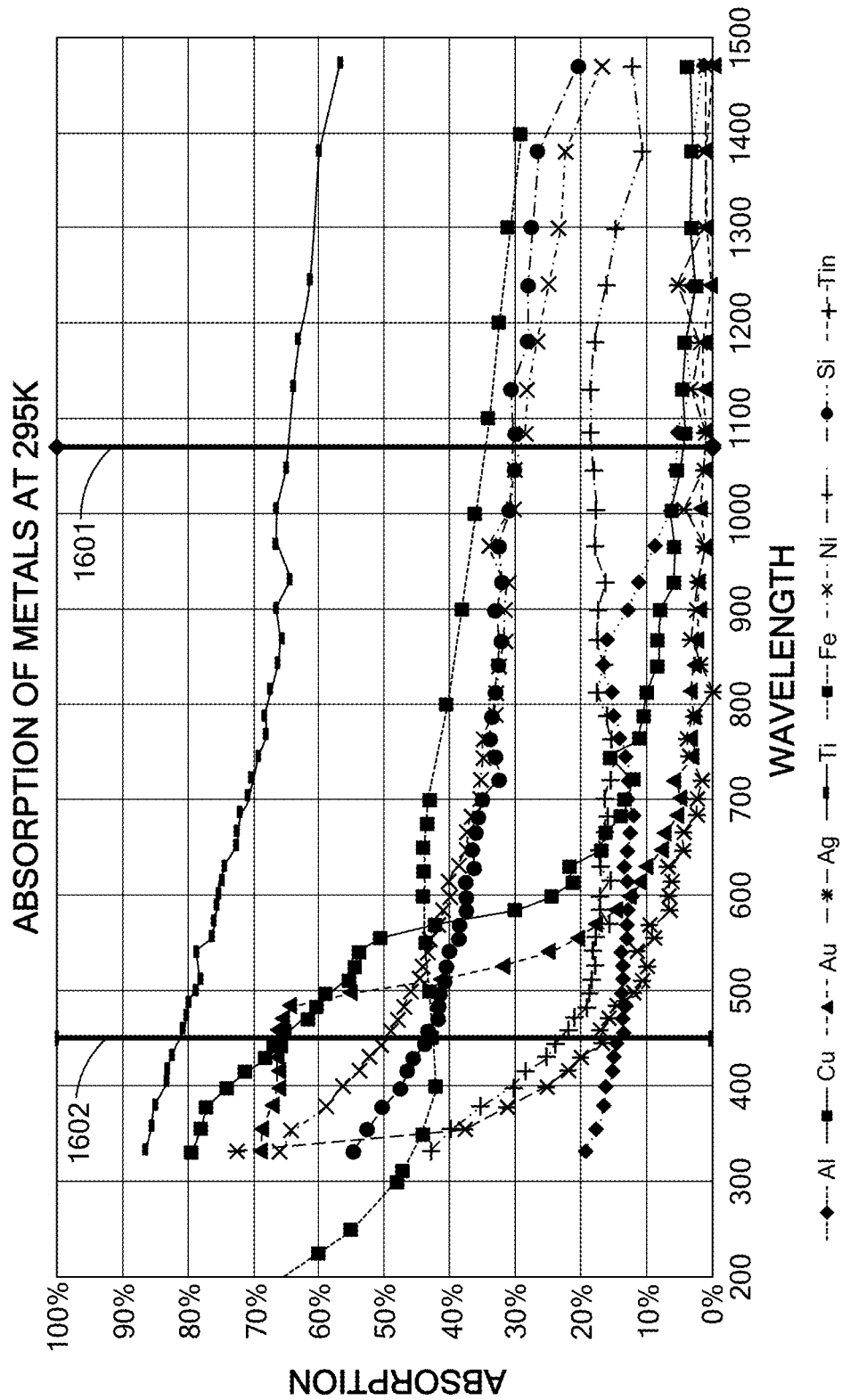
FIG. 9 is the absorption curve for a variety of metals and shows the difference in the absorption between and IR laser a visible laser.
Figure 10:
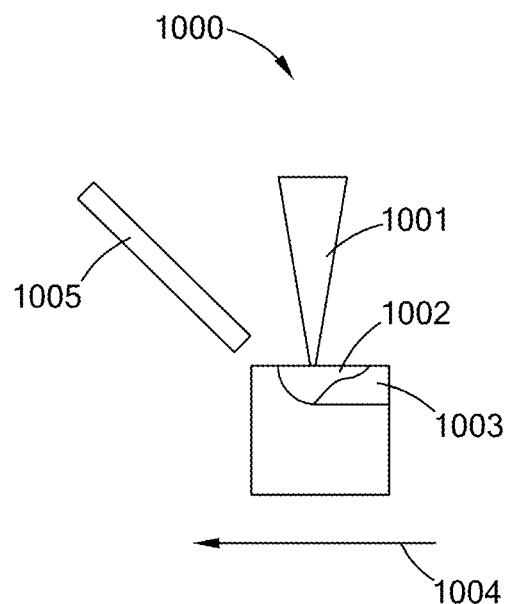
FIG. 10 is a schematic view of an embodiment of a conduction mode weld propagation into the material in accordance with the present inventions.

An embodiments of the present invention relates to methods, devices, and systems for the welding of copper to copper or other materials using a visible laser system to achieve benefits including an efficient heat transfer rate to the copper material; a stable weld puddle; and having these benefits in particular in either the conduction mode or keyhole mode of welding. Copper is highly absorbent in the blue wavelength range as shown in FIG. 9. The presently preferred blue laser beams and laser beam systems and methods couple the laser power into the copper in a very efficient manner. The present laser beam systems and methods heat the base material (the material to be welded, e.g., copper) faster than the heat can be conducted away from the laser spot. This provides for highly efficient, and excelled weld properties for conduction mode laser welding, i.e., the material in the laser beam is rapidly heated to the melting point and maintained at the melting point by the continuous laser beam resulting in a stable weld bead being formed. In the present conduction mode welding, the metal is melted rapidly, but the penetration depth of the weld is dictated by the thermal diffusion into the material and progresses with a spherical shape into the material. This is shown in FIG. 10, which shows a schematic of an embodiment of a conductive mode welding 1000, showing the direction of the weld with arrow 1004. The laser beam 1001, e.g., blue wavelength, is focused on to, and maintains a weld pool 1002. Behind the weld pool 1002 is a solid weld material 1003. The base material, e.g., copper metal or alloy, is below the weld. A shielding gas stream 1005 is also used.

Figure 11:
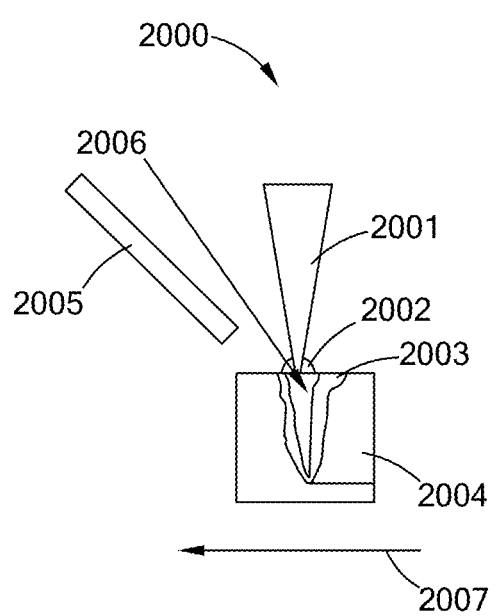
FIG. 11 is a schematic view of an embodiment of a keyhole weld propagation into the material in accordance with the present inventions.

An embodiment of the present inventions relates to keyhole welding of copper with a blue laser system. These methods and systems open new possibilities for welding thick copper materials as well as stacks, including thick stacks, of copper foils. This keyhole mode of welding occurs when the laser energy is absorbed so rapidly that it melts and vaporizes the material being welded. The vaporized metal creates a high pressure in the metal being welded, opening a hole or capillary where the laser beam can propagate and be absorbed. Once the keyhole mode is initiated, deep penetration welding can be achieved. The absorption of the laser beam changes from the initial absorption of 65% for a blue laser in copper to 100% absorption in the keyhole. The high absorption can be attributed to multiple reflections off the walls of the keyhole, where the laser beam undergoes continuous absorption. When combined with the high absorptivity of the copper at the blue wavelength, the power required to initiate the keyhole and maintain it is substantially lower than when using an IR laser. Turning to FIG. 11, which shows a schematic of an embodiment of a keyhole mode weld 2000, showing the direction of the weld with arrow 2007. There is a metal/vapor plasma in the keyhole 2006. The blue laser beam 2002, creates a plasma cloud 2002, a weld pool 2003, and a solid weld metal 2004. A shielding gas stream 2005 is also used.

Comparing the keyhole weld of FIG. 11 with the conduction mode weld of FIG. 10, the walls of the final weld resolidification zone in the keyhole weld are more vertical through the part or base material than the conduction mode weld.

Preferably, the high power laser beams, (e.g., visible, green and blue laser beams), for the embodiments of the present systems and methods are focused, or have the ability to be focused through the optics in the system, to a spot size of about 50 µm or more and have a power of at least 10 W or more. The powers for the laser beams, including the blue laser beams may be 10 W, 20 W, 50 W, 100 W, 10-50 W, 100-250 W, 200-500 W, and 1,000 W, higher and lower powers are contemplated, and all wavelengths within these ranges. The spot sizes (longest cross sectional distance, which for a circle is the diameter) for these powers and laser beams may be from about 20 µm to about 4 mm, less than about 3 mm, less than about 2 mm, from about 20 µm to about 1 mm, about 30 µm to about 50 µm, about 50 µm to about 250 µm, about 50 µm to about 500 µm, about 100 µm to about 4000 µm, large and smaller spots are contemplated, and all sized within these ranges. The power density of the laser beam spots may be from about 50 kW/cm² to 5 MW/cm², about 100 kW/cm² to 4.5 MW/cm², about 100 kW/cm² to 1000 kW/cm², about 500 kW/cm² to 2 MW/cm², greater than about 50 kW/cm², greater than about 100 kW/cm², greater than about 500 kW/cm², greater than about 1000 kW/cm², greater than about 2000 kW/cm², and higher and lower power densities, and all power densities within these ranges. Welding speeds of from about 0.1 mm/sec to about 10 mm/sec for copper, and slower and faster speeds depending upon various conditions, and all speeds within these ranges. The speed depends upon the thickness of the material being welded, thus speed per thickness mm/sec/thickness in mm can be, for example, from 0.1/sec to 1000/sec for 10 µm to 1 mm thickness copper.

Embodiments of the present methods and systems can use one, two, three or more laser beams to form the welds. The laser beams can be focused on the same general area to initiate the weld. The laser beam spots can be overlapping, and can be coincident. The plurality of laser beams can be used simultaneously; and coincident and simultaneous. A single laser beam can be used to initiate the weld followed by addition of the second laser beam. A plurality of laser beams can be used to initiate the weld followed by using less beams, e.g., a single beam, to continue the weld. The laser beams in this plurality of laser beams can be different powers or the same powers, the power densities can be different or the same, the wavelengths can be different or the same, and combinations and variations of these. The use of additional laser beams can be a simultaneous, or sequentially. Combinations and variations of these embodiments of using multiple laser beams may also be used. The use of multiple laser beams can suppress spatter from the weld, and can do so in deep penetration welding methods.

Figure 18:
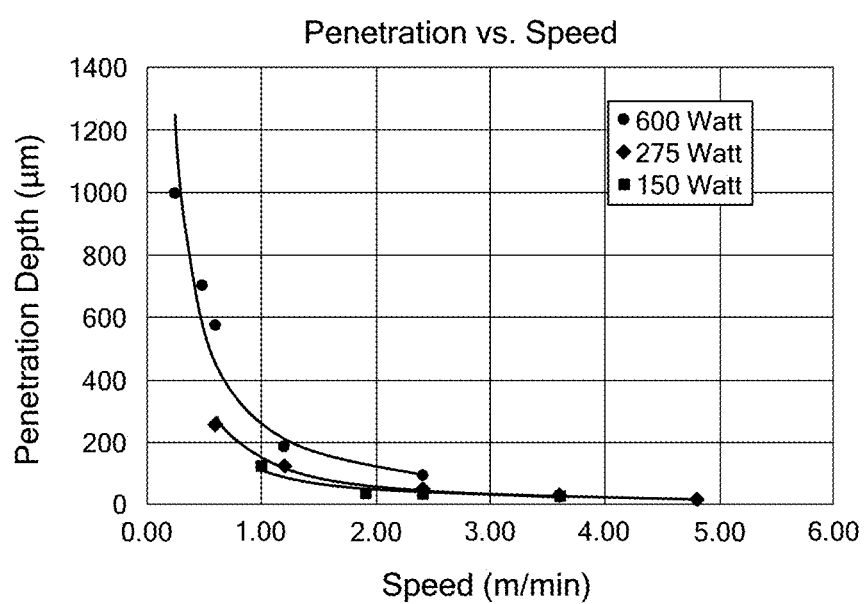
FIG. 18 is a graph of the penetration depth in copper for embodiments of various power levels and various speeds in accordance with the present inventions.

In embodiments hydrogen gas, $H_2$, can be mixed with an inert gas to remove oxide layers from the base material during the welding process. The hydrogen gas is flowed over the weld area. The hydrogen gas also promotes wetting of the weld. The hydrogen gas can be added to, or form a mixture with, the shielding gas and be applied to the weld as a part of the shielding gas. These mixtures would include for example, $Ar-H_2$, $He-H_2$, $N_2-H_2$, FIG. 18 provides examples of the penetration depth, laser beam power and welding speed on copper for various embodiments of laser system configurations and material thicknesses ranging from 127 μm to 500

Methods for Conduction Mode Welding of Copper, Copper Alloys and Other Metals with a Blue Laser System The present systems overcome the problems and difficulties associated with IR welding, when applied to copper based materials. The high absorptivity (65%) of copper at blue wavelengths of the present laser beam and beam spots overcomes the thermal diffusivity of the material, and can do so at relatively low power levels~150 Watts. The present blue laser beam's interaction with copper allows the copper to readily reach its melt point and allow a wide processing window.

In an embodiment a steady conduction mode weld, is performed and high-quality welds are obtained at a steady and rapid rate, through the use of a part holding devices or fixture.

A welding fixture is used to hold the material to be welded in place during the thermal transient induced in the parts by the laser beam. The fixture in FIGS. 12 and 12A, which are a prospective and cross-sectional view respectively, of an embodiment of a linear section of a welding clamp that can be used for lap, butt and even edge welds. The welding fixture 4000 has a base plate or support structure 4002. Attached to the baseplate 4002 are two clamp members, or hold downs, 4001. The hold downs 4001 have a tab that rests on the surface of the baseplate 4002, and a free end that contacts and holds the work piece(s) to be welded. There is a slot 4003, e.g., 2 mm wide×2 mm deep, in the baseplate 4002 in the area between the free ends for the hold downs 4001. Four bolts, e.g., 4004, (other types of adjusting tightening devices may also be used) adjust, tighten and hold the clamps against the work piece, thus holding or fixing the work piece.

Figure 14:
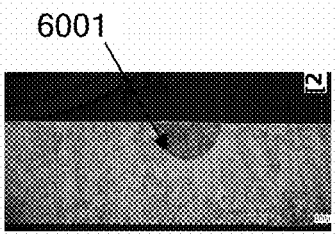
FIG. 14 is a photograph of an embodiment of a bead on plate for a conduction mode weld in accordance with the present inventions.

The preferred material for this fixture is a low thermal conductivity material such as stainless steel because it is sufficiently stiff to apply the clamping pressure required to hold the parts in place during the weld. In embodiments the clamps, the baseplate and both can have insulating qualities or effects on the work piece during the welding process. The use of a material having low thermal conductivity for the fixture prevents, minimizes and reduces the heat that is deposited into the part form being rapidly conducted away by the fixture itself. This provides added benefits when welding high thermal conductivity materials such as copper. Therefore, the material selected for the clamp, the width of the clamp and the gap under the parts are all parameters which determines the depth of penetration of the weld, the width of the weld bead and the overall quality of the weld bead. Turning to FIG. 14, there is shown a cross section (after etching) where the conduction mode weld can be identified by the circular shape 6001 of the weld bead in the base material, e.g., the work piece. The weld takes this shape because of the isotropic nature of the heat transfer process in copper or any other material when the heat is applied at the top surface of the part.

In a preferred embodiment, the baseplate 4002 of the fixture 4000 is constructed of stainless steel, a 2 mm wide gap 4003 is cut into the baseplate to be positioned just below the weld zone and flooded with an inert gas such as Argon, Helium, or Nitrogen (as a covering or shielding gas) to minimize oxidization of the back surface of the weld. The covering gas can be a mixture of hydrogen and an inert gas. The clamps 4001 are designed to put pressure on the parts to be welded at 2 mm from the edges of the gap 4003 in the baseplate 4002. Thus, in this embodiment a 6 mm wide area of the parts to be welded is open to the laser beam (recognizing that the laser beam will be a slight distance away from the clamp). This positioning of the clamps allows the laser beam easy access to the surface as well as a tight clamping of the parts. This type of clamp is the preferred method for butt welding two foils or sheets of copper together varying in thickness from 50 μm to multiple mm. This fixture is also suited to lap welding two thicker copper plates together ranging from 200 μm to multiple mm. The amount of clamping pressure is very important, and depending on the amount of laser power, the speed of the weld, the thickness of the parts and the type of weld being performed the clamping bolts may be torqued to 0.05 Newton-m (Nm), up to 3 Nm, or more for thicker materials. This torque value is highly dependent on the bolt size, the thread engagement and the distance from the bolt center to the clamping point.

Figure 12:
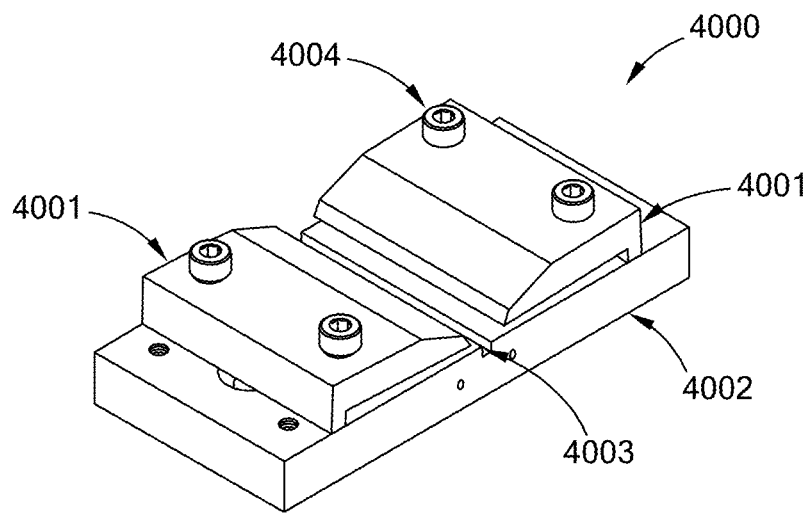
FIG. 12 is a perspective view of an embodiment of a part holder for laser welding in accordance with the present inventions.
Figure 12A:
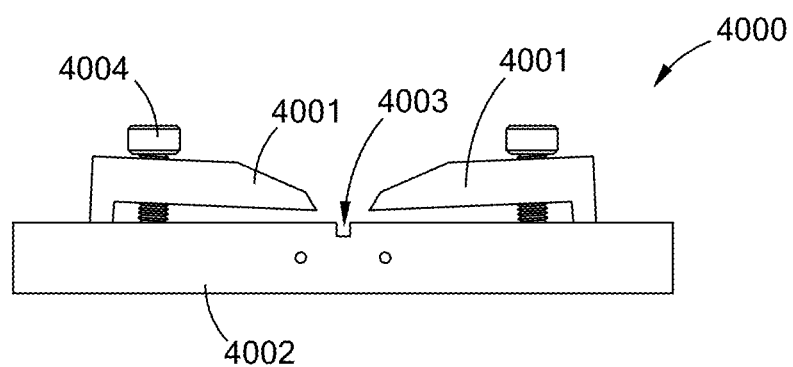
FIG. 12A is a cross sectional view of the part holder of FIG. 12.

In an embodiment high quality and excellent welds are obtained by providing sufficient clamping force to prevent movement of the parts during the weld while minimizing the parasitic heat loss to the fixture itself. It should be understood that the embodiment of the fixture in FIGS. 12 and 12A, represents a cross section of a straight portion of a weld fixture and may be designed into any arbitrary 2-D path (e.g., —S—, —C—, —W— etc.) for welding any types of shapes together. In another embodiment, the fixture may be preheated, or heated during the welding process to increase the speed or depth of penetration of the weld while reducing the parasitic heat losses to the fixture. The fixture when heated to a few 100° C. can improve the weld speed, or depth of penetration and quality by a factor or two or more. The shielding gas for the top side of the weld is delivered longitudinally from the front of the weld travel direction to the back of the weld travel direction as shown in FIG. 10. A bead on plate conduction mode weld is shown in FIG. 14 that was performed with this fixture 4000 on a sheet of 254 μm thick copper. The freeze pattern of the weld bead shows the spherical melt pattern typical of this type of weld.

Lap welding two parts using the conduction mode welding process requires the parts to be placed and held in intimate contact. The two parts (collectively the work piece) can be placed in a fixing device, preferably of the type shown in FIGS. 13 and 13A, which are perspective and cross-sectional view respectively of fixture 5000. The fixture 5000 has a baseplate 5003 and two clamps 5002. The clamps have four slots, e.g., 5010 that correspond to hold down bolts, e.g., 5001. In this manner the position of the clamps relative to the work piece, relative to each other can be adjusted and fixed, as well as the amount of clamping force or pressure. The clamps can have magnets to assist in their positioning, and fixation. The clamps 5002 have internal channels, e.g., 5004 for transporting shielding gas. The channels 5004 are in fluid communication with shielding gas outlets, e.g., 5005. The shielding gas outlets and the shielding gas channels from a shielding gas delivery system within the clamps. Thus, the gas delivery system is, and is through, a row of holes along the length of the clamp that deliver an inert gas such as Argon, Helium, or Nitrogen. Argon is the preferred gas because it is heavier than air and will settle on the part, displacing the oxygen and preventing oxidation of the upper surface. A small amount of Hydrogen can be added to the inert gas to promote scavenging of the oxide layer on the part and promote the wetting of the parts during the melting process.

Figure 13:
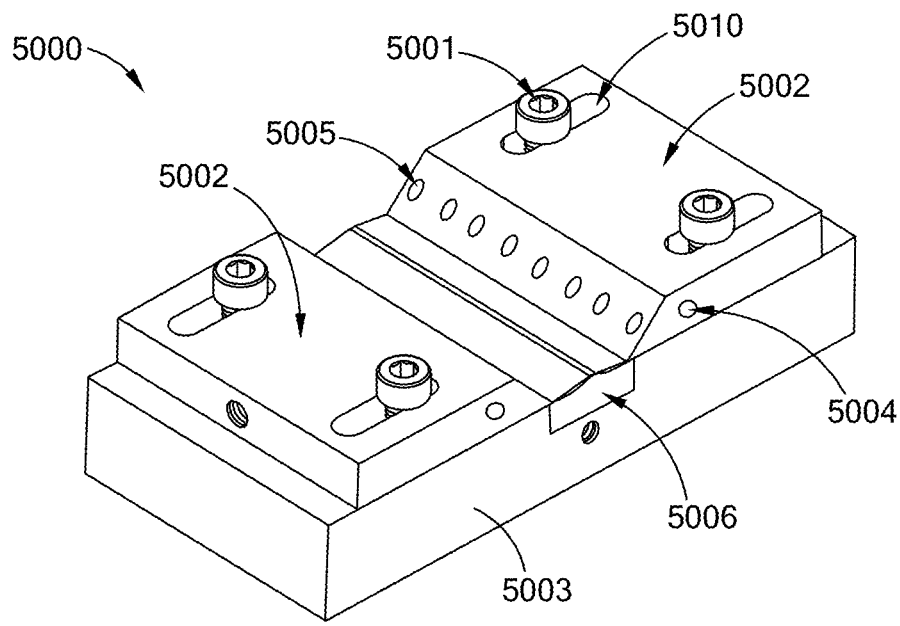
FIG. 13 is a perspective view of an embodiment of a part holder for to hold thin parts to make a lap weld in accordance with the present inventions.
Figure 13A:
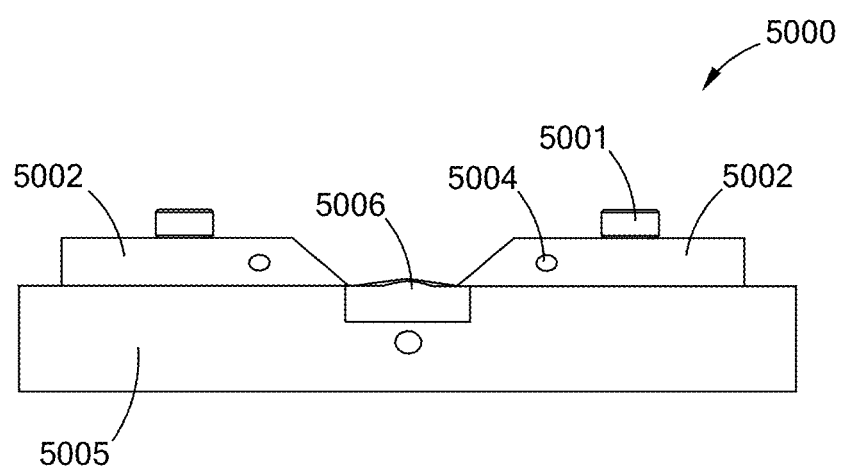
FIG. 13A is a cross sectional view of the part holder of FIG. 13A.

There is also an insert 5006, which is used to force the individual foils in a stack of foils to keep and maintain contact with each other in the stack. The insert 5006 can stretch and force the foils into tight, and uniform contact with each other. In the embodiment of FIGS. 13 and 13A, the insert 5006 is an inverted V shape. It can be curved, humped or other shaped depending upon the stack of foils, and their individual thicknesses. Additionally, in the embodiment of FIGS. 13 and 13A the insert 5006 is adjacent to, but not covered by the clamps 5002. The insert can be removed from the ends of the clamps, or one or both of the clamps may partially cover the insert.

In the preferred embodiment, the baseplate 5000 is made from stainless steel, as are the clamps 5002. The fixation device can be made from a ceramic or thermally insulating material. The hump 5006 provides pressure from the bottom of the weld to keep the overlapping plates (two, three, tens, etc.) in intimate contact. In this embodiment, a provision for shielding gas is built into the clamps (2) in the form of a row of holes along the length of the clamp that deliver an inert gas such as Argon, Helium, or Nitrogen. Argon is the preferred gas because it is heavier than air and will settle on the part, displacing the oxygen and preventing oxidation of the upper surface. The insert hump 5006 in the baseplate 5003 may also have a series of channels, holes or slots, to deliver a cover or shielding gas to the backside of the weld to prevent oxidation. The fixture 5000, as shown in the figures, represents a cross section of a straight portion of a weld and may be designed into any arbitrary 2-D path for welding arbitrary shapes together. In this application, the torque values for the bolts can be important, depending upon the nature of the work piece, too low of a torque value, e.g., 0.1 Nm, and the parts may not remain in contact, too high of a torque value >1 Nm and the parasitic heat transfer reduces the efficiency of the welding process, reducing penetration and weld bead width.

Figure 16:
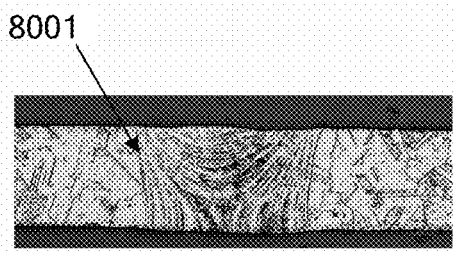
FIG. 16 is a photograph of an embodiment of a bead on plate for a keyhole mode weld in accordance with the present inventions.
Figure 17:
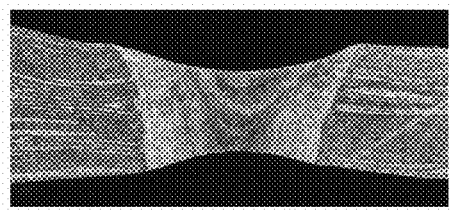
FIG. 17 is photograph of an embodiment of a stack of 40 copper foils welded with the keyhole mode in accordance with the present inventions.

Method for Keyhole Mode Welding Copper, Copper Alloys and Other Metals with a Blue Laser System The blue laser light has a much higher level of absorption than the IR laser (65%) and can initiate a keyhole weld at a relatively low power level of 275 Watts (in contrast to 2,000 to 3,000 W required for an IR system to initiate the keyhole welding process. Upon initiation the IR system will further face the problem of runaway, among other problems.) As the keyhole mode is initiated with the blue laser system, the absorption increases, now it is not a runaway process because it increases from 65% to about 90% and to 100%. Thus, the present keyhole welding process has a very different absorption time profile from IR. The present blue keyhole welding process has an absorption time profile form initiation to advancing the weld that is 35% or less. The startup of the blue laser welding process and the transition to a continuous weld, using the present laser welding systems, is accomplished without having to rapidly changing the power level of the laser or the weld speed, as required when using an IR laser to prevent spatter. A high-speed video of the start of the keyhole weld when using a blue laser shows a stable process, capable of welding multiple layers of copper foils and plates with minimal to no spatter ejected from the keyhole. Cross sections of two keyhole welded sample are shown in FIGS. 16 and 17, where the material freeze pattern is clearly different from the shape of the conduction mode welded sample shown in FIG. 14. The formation of material freeze patterns perpendicular to the surface of the material, as seen in FIGS. 16 and 17, is different from a conduction mode weld because the heat transfer occurs along the entire length of the keyhole which penetrates the surface of the part and extends to the final weld depth. This contrasts to the conduction mode weld, where all the laser energy is deposited on the surface of the material.

The keyhole welding process like the conduction mode welding process requires the parts to be held in a fixture to prevent any movement during the weld. The keyhole mode is typically used in a lap weld configuration, where the keyhole penetrates through the parts, welding a stack of two or more parts together (e.g., as see in FIG. 17).

Figure 20:
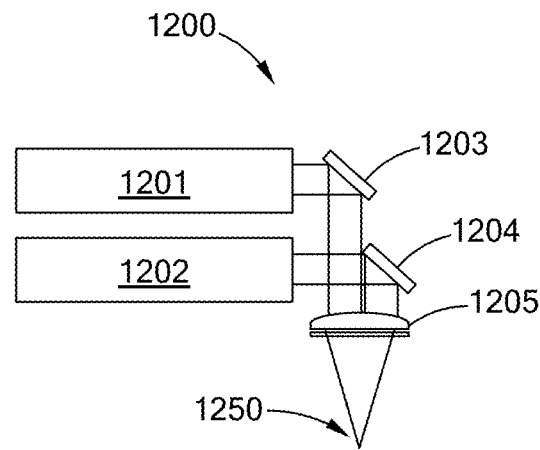
FIG. 20 is a schematic ray trace diagram of an embodiment of using two 150 Watt blue laser systems to make a 300 Watt blue laser system in accordance with the present inventions.

The laser system of FIG. 20, can produce a 275 W blue laser beam, with a power density at the spot of 800 kW/cm$^2$. The laser system of FIG. 20 has a first laser module 1201, and a second laser module 1202, laser beams leave the laser module and follow laser beam paths as shown by ray trace 1200. The laser beams go through turning mirrors 1203, 1205 and through a focusing lens configuration 1205, having a 100 mm focusing lens and 100 mm protective window. The focusing lens in the configuration 1205 creates spot 1250.

Figure 21:
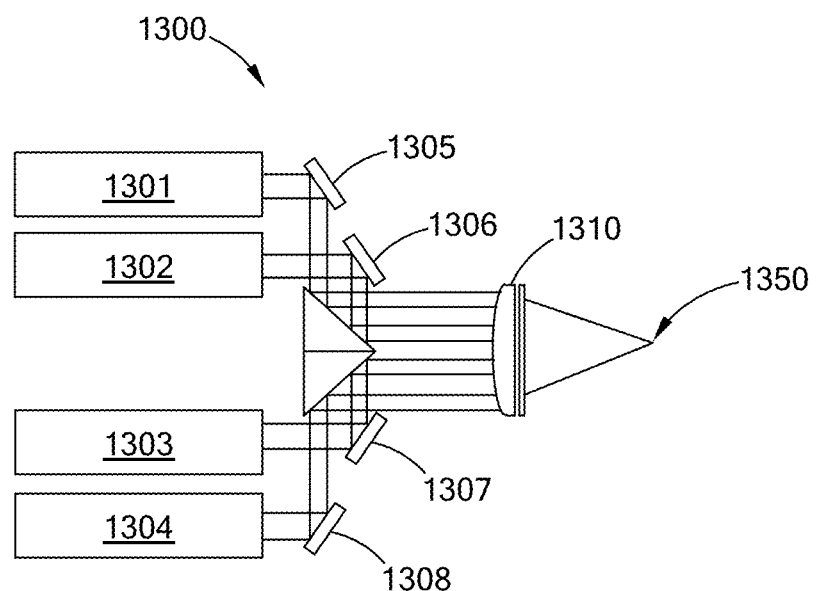
FIG. 21 is a schematic ray trace diagram of an embodiment of using four 150 Watt blue laser systems to make an 800 Watt blue laser system in accordance with the present inventions.

The laser system shown in FIG. 21, can be used to create a 400 µm spot or a 200 µm spot. The laser system of FIG. 21 consists of 4 laser modules 1301, 1302, 1303, 1304. The laser modules can each be of the type disclosed and taught in US Patent Publ. No. 2016/0322777, the entire disclosure of which is incorporated herein by reference. For example, the modules can be of the type shown in FIG. 19, where composite beam from each of the laser diode subassemblies, 210, 210*a*, 201*b*, 210*c*, propagates to a patterned mirror, e.g., 225, which is used to redirect and combine the beams from the four laser diode subassemblies into single beams. A polarization beam folding assembly 227 folds the beam in half in the slow axis to double the brightness of the composite laser diode beam. The telescope assembly 228 either expands the combined laser beams in the slow axis or compresses the fast axis to enable the use of a smaller lens. The telescope 228 shown in this example expands the beam by a factor of 2.6×, increasing its size from 11 mm to 28.6 mm while reducing the divergence of the slow axis by the same factor of 2.6×. If the telescope assembly compresses the fast axis then it would be a 2× telescope to reduce the fast axis from 22 mm height (total composite beam) to 11 mm height giving a composite beam that is 11 mm×11 mm. This is the preferred embodiment, because of the lower cost. An aspheric lens 229 focuses the composite beam.

It should be understood that at 500 Watts and a 200 µm spot, the power density is >1.6 MW/cm$^2$, which is substantially above the keyhole welding threshold at this wavelength. At this power density, even the blue laser has the potential to create spatter and porosity in the weld. However, since the absorption is well controlled, the ability to suppress, control or eliminate, the spatter is possible. The first method for suppressing the spatter is to reduce the power level once the spatter process begins, while holding the welding speed constant. The second method for suppressing the spatter is to elongate the weld puddle to allow the shielding gases and vaporized metal to exhaust from the keyhole, producing a spatter free, defect free weld. The third method for suppressing the spatter is to wobble the blue laser beam using either a set of mirrors mounted on a set of galvanometer motors or a robot. The fourth method for suppressing the spatter is to reduce the pressure of the welding environment including the use of a vacuum. Finally, the fifth method for suppressing the spatter is to modulate the laser beam power over a range of 1 Hz to 1 kHz, or as high as 50 kHz. Preferably, the welding parameters are optimized to minimize the spatter during the process.

In general, embodiments of the present inventions relate to laser processing of materials, laser processing by matching preselected laser beam wavelengths to the material to be processed to have high or increased levels of absorptivity by the materials, and in particular laser welding of materials with laser beams having high absorptivity by the materials.

An embodiment of the present invention relates to using laser beams having visible laser beams, wavelengths from 350 nm to 700 nm, to weld or otherwise join through laser processing, materials that have higher absorptivity for these wavelengths. In particular laser beam wavelengths are predetermined based upon the materials to be laser processed to have absorption of at least about 30%, at least about 40%, at least about 50% and at least about 60%, or more and from about 30% to about 65%, from about 35% to 85%, about 80%, about 65%, about 50, and about 40%. Thus, for example, laser beams having wavelengths from about 400 nm to about 500 nm are used to weld gold, copper, brass, silver, aluminum, nickel, alloys of these metals, stainless steel, and other metals, materials, and alloys.

The use of a blue laser, e.g., about 405 to about 495 nm wavelength, to weld materials such as gold, copper, brass, silver, aluminum, nickel, nickel plated copper, stainless steel, and other, materials, plated materials and alloys, is preferred because of the high absorptivity of the materials at room temperature, e.g., absorptivities of greater than about 50%. One of several advantages of the present inventions is the ability of a preselected wavelength laser beam, such as the blue laser beam, that is better able to better couple the laser energy into the material during the laser operation, e.g., the welding process. By better coupling the laser energy to the material being welded, the chance of a run away process is greatly reduced and preferably eliminated. Better coupling of the laser energy also allows for a lower power laser to be used, which provides cost savings. Better coupling also provides for greater control, higher tolerances and thus greater reproducibility of welds. These features, which are not found in with IR lasers and IR laser welding operations, are important, to among other products, products in the electronics and power storage fields.

In an embodiment a blue laser that operates in a CW mode is used. CW operation can be preferred over pulsed lasers, in many applications, because of the ability to rapidly and fully modulate the laser output and control the welding process in a feedback loop, resulting in a highly repeatable process with optimum mechanical and electrical characteristics.

In an embodiment of the present inventions involve the laser processing of one, two or more components. The components may be made from any type of material that absorbs the laser beam, e.g., the laser beams energy, plastics, metals, composites, amorphous materials, and other types of materials. In an embodiment the laser processing involves the soldering together of two metal components. In an embodiment the laser processing involves the welding together of two metal components.

In an embodiment there is provided the tools, systems and methods wherein the laser welding operation is selected from the group consisting autogenous welding, laser-hybrid welding, keyhole welding, lap welding, filet welding, butt welding and non-autogenous welding.

Laser welding techniques may be useful in many varied situations, and in particular where welding is needed for forming electrical connections, and in particular power storage devices, such as batteries. Generally, embodiments of the present laser welding operations and systems include visible wavelength, and preferably blue wavelength, lasers that can be autogenous which means only the base material is used and is common in keyhole welding, conduction welding, lap welding, filet welding and butt welding. Laser welding can be non-autogenous where a filler material is added to the melt puddle to "fill" the gap or to create a raised bead for strength in the weld. Laser welding techniques would also include laser material deposition ("LMD").

Embodiments of the present laser welding operations and systems include visible wavelength, and preferably blue wavelength, lasers that can be hybrid welding where electrical current is used in conjunction with a laser beam to provide more rapid feed of filler material. Laser Hybrid welding is by definition non-autogenous.

Preferably, in some embodiments active weld monitors, e.g., cameras, can be used to check the quality of the weld on the fly. These monitors can include for example x-ray inspection and ultrasonic inspection systems. Furthermore, on stream beam analysis and power monitoring can be utilized to have full understanding of system characteristics and the operations characterizations.

Embodiments of the present laser systems can be a hybrid system that combine the novel laser systems and methods with conventional milling and machining equipment. In this manner material can be added and removed during the manufacturing, building, refinishing or other process. Examples of such hybrid systems, using other embodiments of laser systems, which have been invented by one or more of the present inventors, is disclosed and taught in U.S. patent application Ser. No. 14/837,782, the entire disclosure of which is incorporated herein by reference.

Typically, in embodiments, laser welding uses a very low flow of gas to keep the optics clean, an air knife to keep the optics clean or an inert environment to keep the optics clean. Laser welding can be performed in air, an inert environment, or other controlled environment, e.g., $N_2$.

Embodiments of the present invention can find great advantage in welding copper materials, which would include copper, pure copper, alloys of copper and all materials having sufficient amounts of copper to have at about a 40% to 75% absorption in the blue laser wavelengths, and preferably about 400 nm to about 500 nm.

There are two preferred autogenous welding modes, and autogenous welds that they produce, that are performed with embodiments of the present laser systems and processes, a conduction weld and a keyhole weld. The conduction weld is when a laser beam with a low intensity (<100 kW/cm$^2$) is used to weld two pieces of metal together. Here the two pieces of metal may be butted up to each other, overlapping to one side and completely overlapping. The conduction weld tends not to penetrate as deeply as a keyhole weld and it generally produces a characteristic "spherical" shape weld joint for a butt weld, which is very strong. However, a keyhole weld occurs with a relatively high laser beam intensity (>500 kW/cm$^2$) and this weld can penetrate deep into the material and often through multiple layers of materials when they are overlapped. The exact threshold for the transition from conduction mode to key-hole mode has not yet been determined for a blue laser source, but the key-hole weld has a characteristic "v" shape at the top of the material with a near parallel channel of refrozen material penetrating deep into the material. The key-hole process relies on the reflection of the laser beam from the sides of the molten pool of metal to transmit the laser energy deep into the material. While these types of welds can be performed with any laser, it is expected that the blue laser will have a substantially lower threshold for initiating both of these types of welds than an infrared laser.

The welding of electroplated material using blue laser operations to weld these materials is contemplated, including the blue laser welding of electroplated materials, such as materials electroplated with copper, electroplated with platinum, and electroplated with other conductive material.

A welding process for copper requires that the power be coupled efficiently into the parts, and for the welding process to be stable and capable of producing a low porosity, low spatter weld. The present inventions accomplish these, and other objectives. The blue laser accomplishes the first part of these requirements by being at a wavelength that is highly absorbed by the copper (65%) compared to an IR laser (<5%). The second requirement is a function of not only the laser absorption, but also the processing ramp or time profile, fixturing, beam profile and quality and the clamping pressure used on the parts. The present embodiments provide that both a keyhole mode and a conduction mode weld are possible with the blue laser as a heat source. Conduction mode welding does not produce any spatter during the process or porosity in the part. The keyhole mode of welding, will allow for greater penetration. The embodiments of the present high-power blue CW laser source is ideal for welding copper parts with very low porosity in the part and very low spatter during the process.

Full penetration, bead on plate tests of a 1 mm thick copper plate with a 600-Watt blue laser with nominal spatter remaining on the surface. The 600-Watt, CW laser is focused to a spot size of approximately 200 µm, resulting in an average intensity at the surface of the part of 2.1 MW/cm². This intensity is well above the power density required to initiate and sustain the keyhole in the part. During the welding process, the keyhole forms rapidly and once full penetration is achieved, the molten puddle exhibits a very stable surface indicating low turbulence in the weld puddle as the weld progresses. The stable welding process is observed over a wide range of welding speeds and with an Ar—$CO_2$ cover gas for, among other things, suppressing the surface oxidation during the welding process. This ability to create a stable keyhole weld can be attributed to, among other things, the high absorptivity of the copper in the blue. The blue laser light is uniformly absorbed by the walls of the keyhole during the welding process, however, when instabilities in the keyhole arise due to turbulence in the melt puddle, the heat input is maintained, and the keyhole remains stable.

The following examples are provided to illustrate various embodiments of the present laser systems and operations and in particular a blue laser system for welding components, including components in electronic storage devices. These examples are for illustrative purposes, may be prophetic, and should not be viewed as, and do not otherwise limit the scope of the present inventions.

Example 1

The laser source is a high power blue direct diode laser capable of 0-275 Watts. The beam is delivered through a 1.25× beam expander and focused by a 100 mm aspheric lens. The spot diameter on the workpiece is 200 µm×150 µm which produces a power density at maximum power of 1.2 MW/cm². A stainless steel fixture is used to hold the samples in place and tests were performed with He, Ar, Ar—$CO_2$ and Nitrogen, all were beneficial, with the best results achieved with Ar—$CO_2$.

Example 1A

Using the system of Example 1, initial test results produced high quality conduction mode welds at power levels of 150 Watts on the copper surface. A series of Bead on Plate (BOP) tests were conducted to characterize the welds produced by the high power blue laser source. FIG. 1 shows the chevron pattern for a conduction mode weld, the unique characteristics of this weld include; no spatter during the welding process, a microstructure that resembles the base material and hardness of the weld is like the base material. FIG. 1 shows the BOP formed when welding with a blue laser at 150 Watts on a 70 µm thick copper foil.

Example 1B

Figure 2:
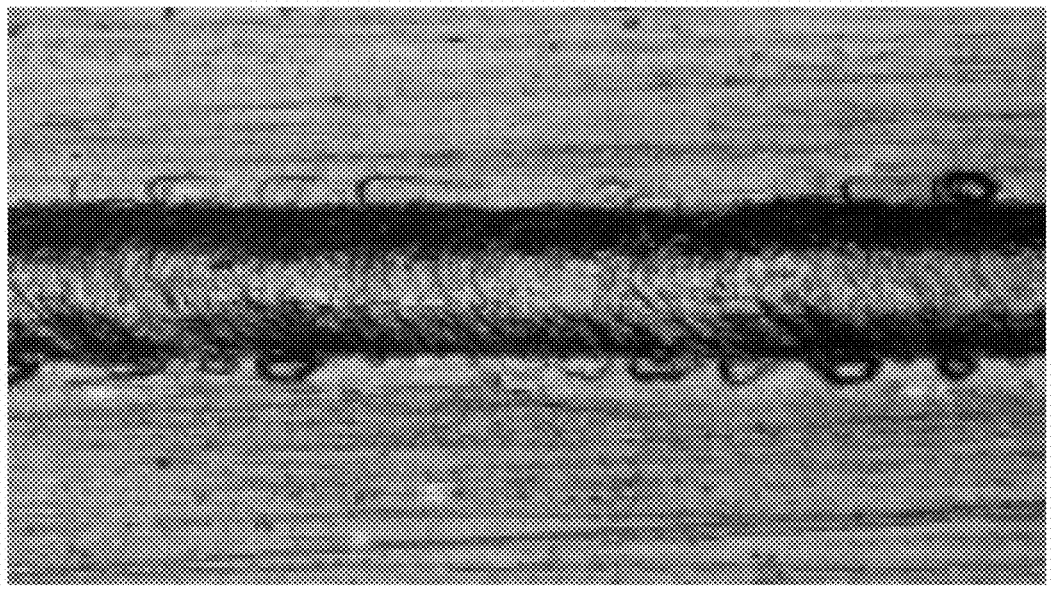
FIG. 2 is a photograph of an embodiment of a keyhole weld on copper in accordance with the present inventions.

Using the system of Example 1 and scaling the power output of the laser to 275 Watts increased the power density to 1.2 MW/cm² which is sufficient power density to initial keyhole welding in copper. FIG. 2 shows an example of a keyhole weld on a 500 µm thick copper sample. During the keyhole process, the vapor pressure developed in the keyhole forces molten copper out of the weld bead. This can be seen in FIG. 2 where the ejected copper lines the edges of the weld bead. This ejection process is stable and does not result in micro-explosions in the material and consequently it does not produce the spatter patterns observed when welding copper with an IR laser source.

Example 1C

Figure 3:
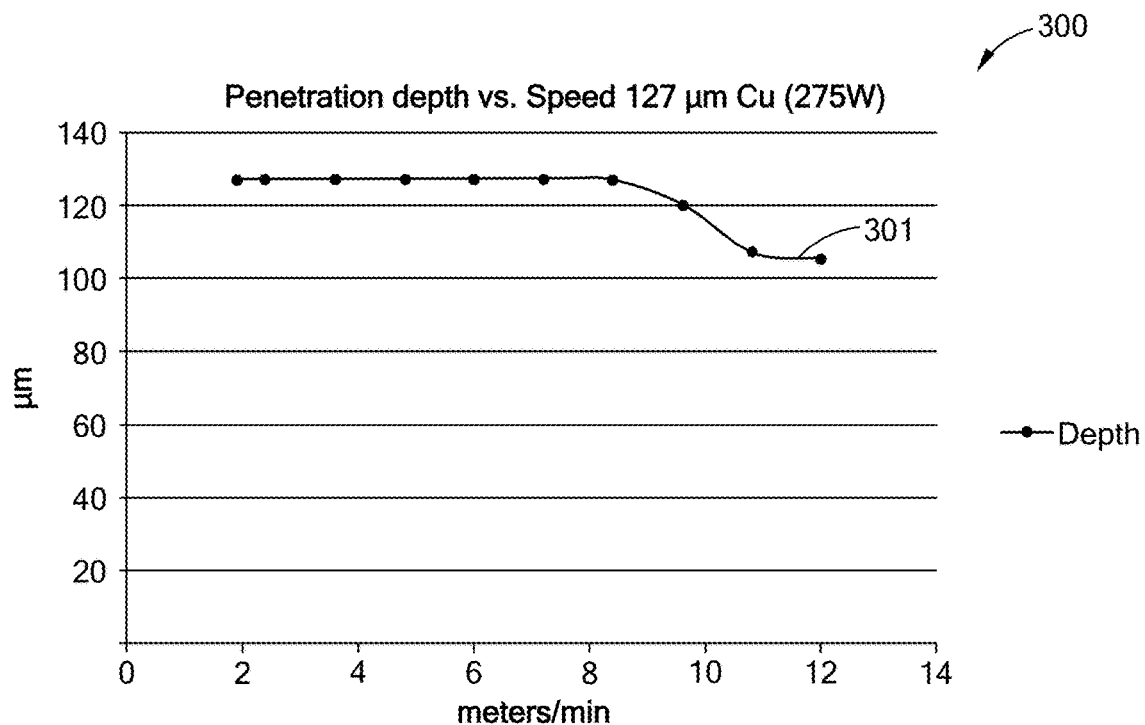
FIG. 3 is a chart showing penetration depth vs speed for an embodiment of the present inventions for 127 μm thick copper, where the copper is fully penetrated up to the speed of 8 m/min.
Figure 4:
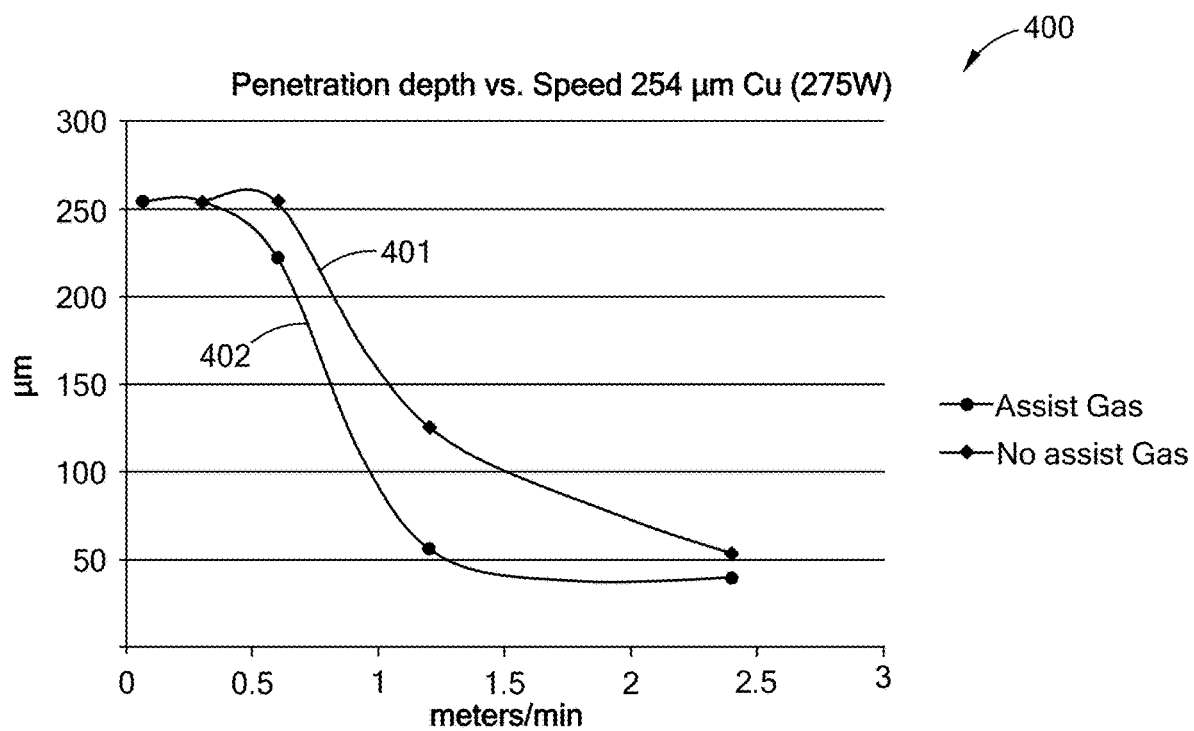
FIG. 4 is a chart showing penetration depth vs speed for an embodiment of the present inventions for 254 μm thick copper, where the copper is fully penetrated up to the speed of 0.5 to 0.75 m/min.
Figure 5:
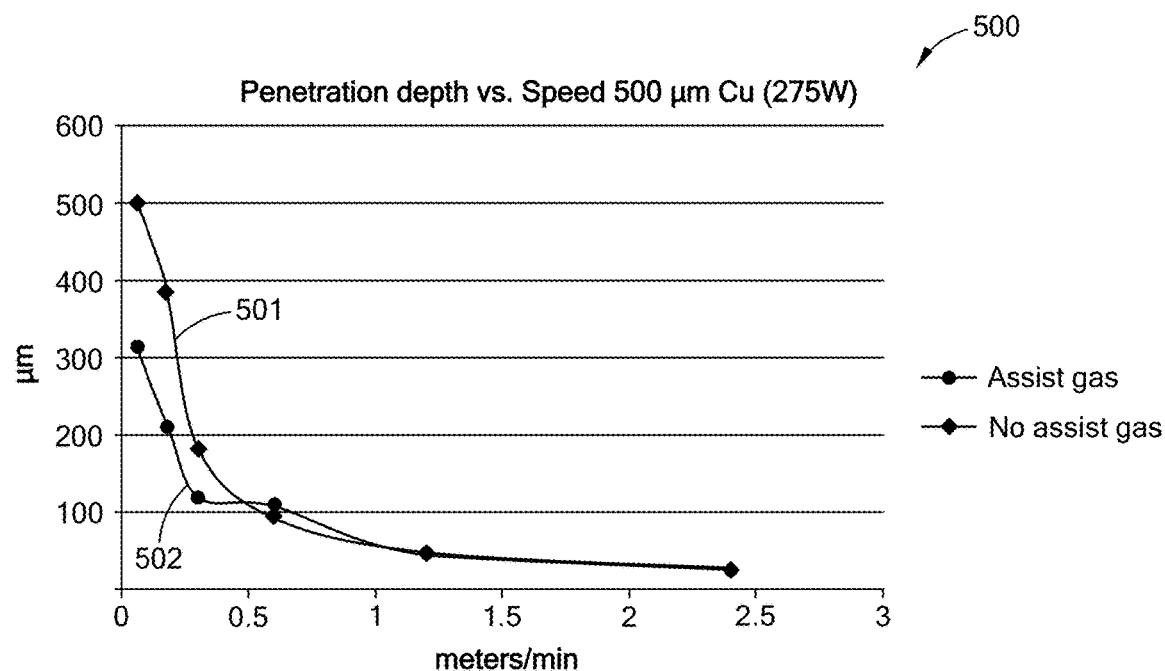
FIG. 5 is a chart showing penetration depth vs speed for an embodiment of the present inventions.

Using the system of Example 1, welding experiments were performed for copper thicknesses ranging from 127-500 µm. FIGS. 3-5 summarize the results of these BOP tests. FIG. 3 shows full penetration up to 9 m/min at 275 W followed by a falloff of the penetration depth with speed as expected. FIG. 4 shows BOP results with full penetration up to 0.6 m/min with no-assist gas and 0.4 m/min when using Ar—$CO_2$ cover gas. FIG. 5 shows depth of penetration vs. Speed for 500 µm Copper at 275 W.

Example 2

The fixture 5000 of FIGS. 13 and 13A is used to successfully lap weld a stack of 2 copper foils, 178 µm thick with a conduction mode weld. The fixture when heated to a few 100° C. results in an improvement in the weld speed and quality by a factor or two or more because the energy lost to heating the part during the weld is now provided by the pre-heat. The shielding gas for the top side of the weld is delivered at the front of the weld travel direction to the back of the weld travel direction as shown in FIG. 10.

Example 3

Figure 15:
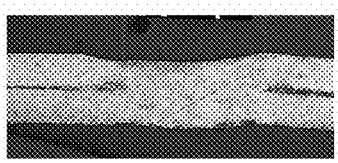
FIG. 15 is a photograph of an embodiment of a stack of foils welded with the conduction welding mode in accordance with the present inventions.

Two 125 µm thick copper plates were lap welded together using the fixture 5000, with a conduction mode weld. This weld is shown in the cross-section photograph of FIG. 15.

Example 4

Using the fixture 5000 shown in FIGS. 13 and 13A, a stack of 40 copper foils, 10 µm thick are welded with no porosity and no defects. A cross section of this weld is shown in FIG. 17. Welding this stack depends on how the foils are prepared, how the foils are clamped and how much torque is applied to the clamps. The foils are sheared and flattened, then they are cleaned with alcohol to remove any manufacturing or handling oils and finally stacked in the fixture. The clamping bolts 5001 are torqued to 1 Nm to insure the parts are held firmly in place during the welding process. The laser used to weld these parts consist of four of the 150-Watt lasers shown in FIG. 19 optically combined as shown in FIG. 21 to create a 500-Watt laser system. This laser produces a 400 µm spot with an average power density of 400 kW/cm$^2$, and a peak power density sufficient to initiate the keyhole welding process.

Example 5

Embodiment of the present laser beam welding techniques are evaluated using the first full penetration, bead on plate (BOP) welds of a 1 mm thick copper plate with a 600-Watt blue laser with nominal spatter remaining on the surface. The 600-Watt, CW laser is focused to a spot size of approximately 200 um, resulting in an average intensity at the surface of the part of 2.1 MW/cm$^2$. This intensity is well above the power density required to initiate and sustain the keyhole in the part. During the welding process, the keyhole is observed to form rapidly and once full penetration is achieved, the molten puddle exhibits a very stable surface indicating low turbulence in the weld puddle as the weld progresses. The stable welding process is observed over a wide range of welding speeds and with an AJ-CO$_2$ cover gas for suppressing the surface oxidation during the welding process. This ability to create a stable keyhole weld can be attributed to the high absorptivity of the copper in the blue and the uniformity and high quality of the laser beam. The blue laser light is uniformly absorbed by the walls of the keyhole during the welding process, however, when instabilities in the keyhole arise due to turbulence in the melt puddle, the heat input is maintained, and the keyhole remains stable.

Example 6

Embodiments of the present inventions use the present high power visible lasers, and in particular blue lasers, blue green lasers and green lasers, for in industrial applications, such as welding. In embodiments of these processes power levels of 500-600 Watts and spot sizes of 200-400 um are used. The wavelength for these embodiments is in the blue range. Stable conduction mode welding of copper is observed over a wide range of speeds for both the 400 and 200 um spot sizes on Oxygen Free Copper (OFC). This welding mode is spatter free and fully dense with no signs of porosity throughout the welded parts. The stable keyhole mode welding is observed in copper with only the 200 um spot size, however with lower conductivity materials such as Inconel and stainless steel, even the 400 um spot size can achieve a keyhole weld. Modelling of the welding process reveals a significant difference in the shape and size of the weld puddle when welding copper compared to stainless steel. The stainless steel with the lower thermal conductivity exhibits a classic teardrop shape weld puddle, however, the copper with its high thermal conductivity exhibits a circular weld puddle much smaller in size for the same power level as used in the welding of the stainless samples.

Example 7

Laser welds of metals using blue, blue green or green laser beams are conducted without wobbling the beam. These welds have deep penetration. Thus, there is provided wobble free welding of metals, including copper foils, and copper plates, using these laser beams. There is provided wobble free welding on aluminum, stainless steel, copper, aluminum based metals, stainless steel based metals, copper based metals and alloys of these.

In an embodiment of this wobble free laser welding, blue laser welding is conducted on copper having a thickness of less than 1 mm and with a blue laser beam having a wavelength of 450 nm.

In an embodiment of this wobble free laser welding, blue laser welding is conducted on aluminum having a thickness of less than 1 mm and with a blue laser beam having a wavelength of 450 nm.

In an embodiment of this wobble free laser welding, blue laser welding is conducted on stainless steel having a thickness of less than 1 mm and with a blue laser beam having a wavelength of 450 nm.

Example 8

Figure 19:
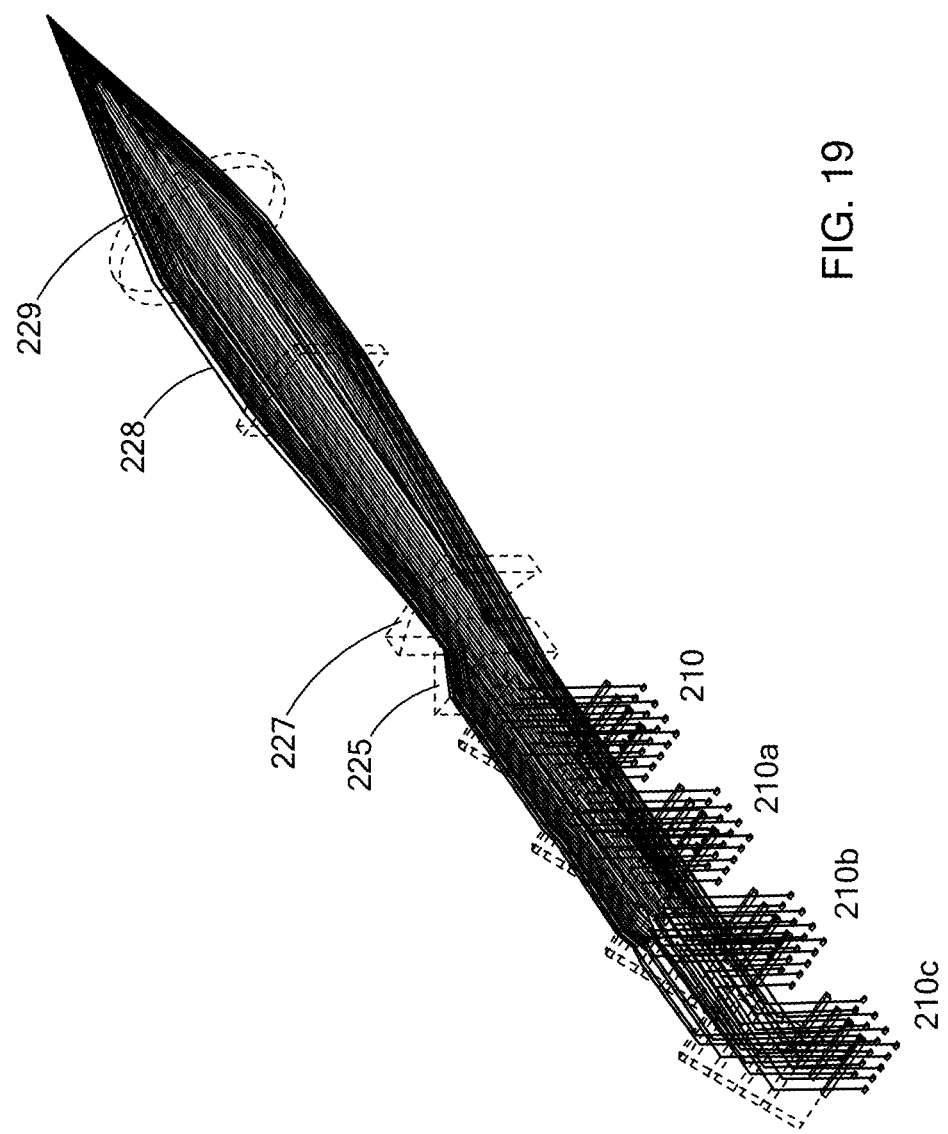
FIG. 19 is a schematic of an embodiment of a 150 Watt blue laser system for use in performing embodiments of the present laser welding methods in accordance with the present inventions.

An embodiment a 600-Watt laser having four 200-Watt blue laser modules providing a laser beam having a wavelength of 450 nm. The lasers diodes are individually collimated, and the beam divergence is circularized as shown in FIG. 19 resulting in a beam parameter product of 22 mm mrad for each module. The laser beams from the four blue laser modules are optically sheared in both the horizontal, as well as the vertical direction, to fill out the aperture of the 100 mm diameter focusing optic as shown in FIG. 21. This composite beam (450 nm) has a beam parameter product of 44 mm mrad and is suitable for launching into a 400 µm fiber. For Examples 8A to 8K and 9, an optical fiber was not used and this blue laser beam is delivered via free space to the work piece.

For these Examples an optical breadboard is used having a 4'×6' optical bench which allows the integration of real time beam diagnostics into the setup. The composite output beam is sampled with a 1% beam sampler and a portion of the beam is sent to a far-field profile camera and a power meter. The far-field is generated with the same focal length lens as the welding lens, either a 100 mm F/1 lens or a 200 mm F/2 lens. Both lenses are BK7 aspheres from ThorLabs. The lenses are underfilled to about 80 mm, and the spot at the workpiece is approximately 200 µm for the 100 mm FL lens, and approximately 400 µm for the 200 mm FL lens.

Figure 22:
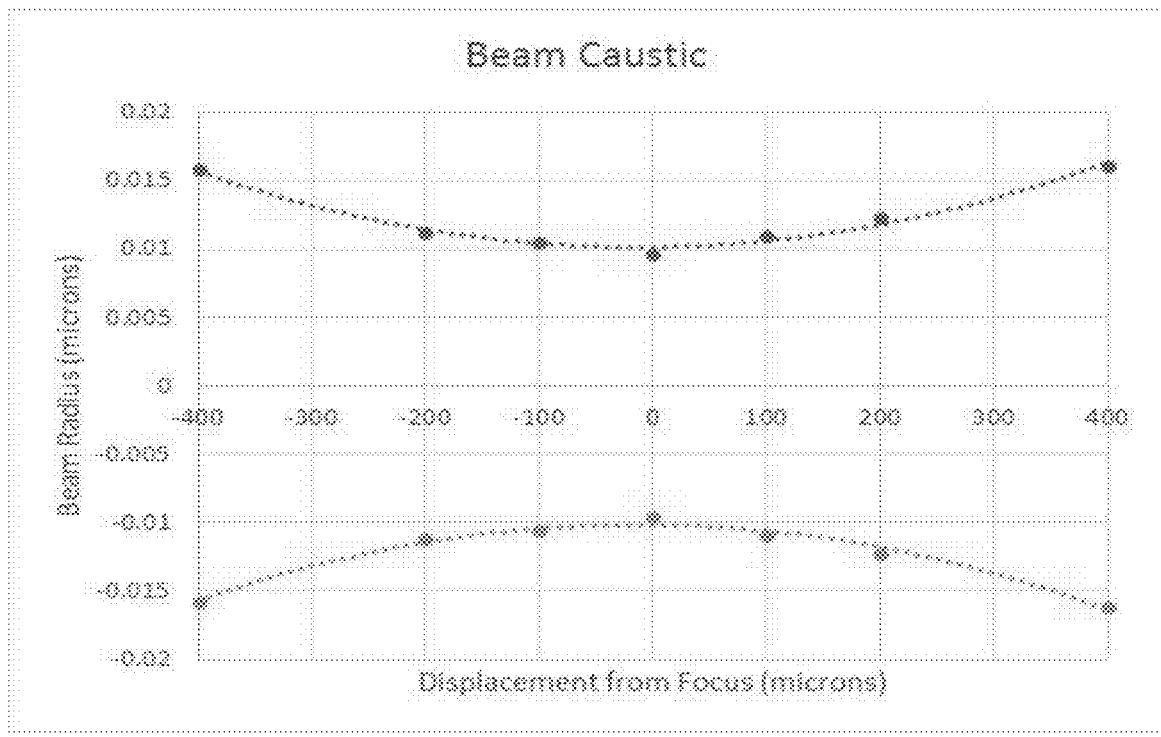
FIG. 22 is a graph of an embodiment of the radius of the beam caustic (microns (μm)) vs displacement from focus (μm) using a 100 mm focal length lens at 600 W for a circular aperture containing 95% of the encircled power in accordance with the present inventions.

The beam caustic is measured by translating the Ophir beam profiler through the focus of the 100 mm FL lens in the beam sampling arm of the setup and measuring the diameter of the beam at the 95% encircled power point. The graph of the beam caustic is shown in FIG. 22. This measurement demonstrates the relatively short depth of focus for the 100 mm FL lens.

A Fanuc 6-axis robot (FANUC M-16iB) is used to move the sample through the free space beam focus with the cover gas being provided by a ⅜" diameter sparger tube mounted on the robot adapter and directed along the direction of the weld.

For Examples 8A to 8K and 9, an embodiment of a welding fixture of the type shown in FIGS. 12 and 12A is used. The welding fixture is a part of the welding process and when welding high thermal conductivity materials, it can affect the penetration depth, weld speeds, and both, that can be achieved. FIGS. 12 and 12A are drawings of the embodiment of the welding fixture. In one embodiment aluminum (6061 series) is used. In another embodiment stainless steel (316) is used. The aluminum welding fixture tends to take the heat out of the part rapidly, while the stainless-steel fixture allows most of the heat to stay within the part. Both materials are evaluated along with different methods for clamping the samples (e.g., work piece, part). An inert gas such as Argon—$CO_2$ is flowed over the top of the part placed in the fixture to suppress any oxidation of the parts during the welding process. A small gap 4003 is located under the center of the sample to minimize the heat sinking at the point of the bead on plate Examples and allow an assist gas to be added to the back side of the weld.

In the keyhole mode of welding can produce a strong plume when welding. Since the atoms and ions in the plume readily absorb the 450 µm light, this plume should be managed and preferably suppressed. A ⅜" diameter tube sparger is used to suppress the plume by delivering 50 scfh of Argon or Argon-$CO_2$ across the top of the part. Welds can be conducted or made with various gasses to manage the plume and avoid oxidation of the parts, including Argon, Argon-$CO_2$, Air, Helium and Nitrogen. The goals of optimizing welding processes, among others, is to achieve the greatest penetration at the highest possible speed. The data presented in Examples 8A to 8K use Argon as the cover gas. In other laser welding and processing applications, such as butt welding, plume management is desirable, and preferred.

For the 500 Watts welding tests of Examples 8A to 8F, a 200 mm focal length lens is used to focus the beam to a 400 µm spot size resulting in an average intensity of ~400 $kW/cm^2$ and a peak intensity approaching 800 $kW/cm^2$.

For the 600 Watts welding tests of Examples 8G to 8K, a 100 mm focal length lens is used to focus the beam to a 200 µm spot size resulting in an average intensity of approximately 2.1 $MW/cm^2$ and the peak intensity approaches 4.5 $MW/cm^2$.

Example 8A

Using the laser, processes, and set up of Example 8, bead on plate welding is conducted and evaluated with copper (OFC), Stainless Steel (304) and aluminum (1100 series) using 500 Watts, a spot size of 400 µm and an average power density of 400 $kW/cm^2$. The samples are all cut to 10 mm×45 mm in size with a shear and cleaned with acetone prior to processing. The surface finish is as supplied from McMaster Carr, which looks like a rolled finish for the thinner samples and a milled finish for the thicker samples. These evaluations characterize the full penetration capability of the welding process of Example 8 for a given sheet thickness.

Figure 23:
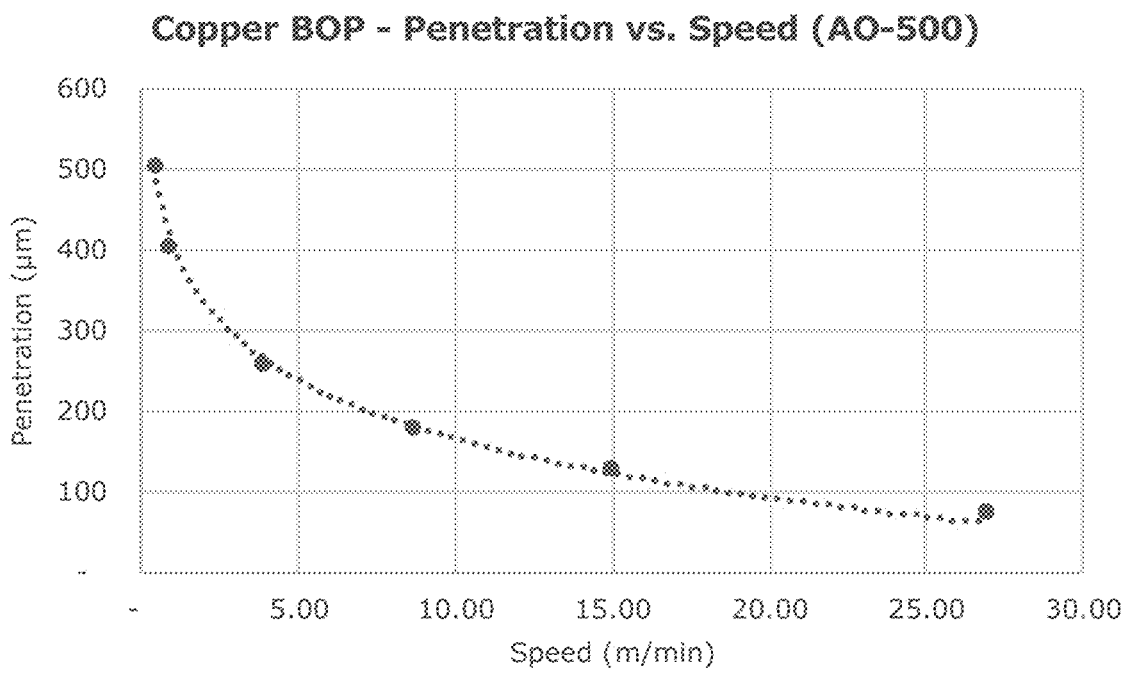
FIG. 23 is a graph of an embodiment of Coper 110 bead on plate (BOP) testing, showing penetration (μm) vs. speed m/min in accordance with the present inventions.

Using the laser, processes, and set up of Example 8, Bead on plate evaluations are performed with Oxygen Free Copper (99.99%-110) samples that ranged in thickness from 80 µm to 500 µm. FIG. 23 shows the weld speed at which a full penetration bead is observed on the backside of the welded sample.

The samples were wiped down with acetone prior to the evaluation and clamped in the fixture with the bolts torqued to 1 Newton-meter. The fixture and sample were held at a 20-degree angle to the beam normal to prevent back reflections into the laser, causing an elongation of the spot to 400 µm×540 µm for the 200 mm FL lens. The beam angle is from the beam normal to the trailing side of the part to be welded. This tilt of the sample most likely reduces the maximum welding speeds that can be achieved due to the lower intensity on the part. The sequence of the weld is the robot is commanded to translate the part, with enough distance between the part and the laser beam to insure the robot has reached the programmed speed, the laser is initiated just as the weld fixture crosses the position of the laser beam. The part is translated through the beam at a constant velocity, once the end of the weld fixture is reached, the laser beam is turned off and the robot is commanded to return to its home position. The samples are cross sectioned, polished and etched to reveal the microstructure. All the welds exhibited a spherical melt-freeze pattern indicative of a conduction mode weld.

Example 8B

Figure 24:
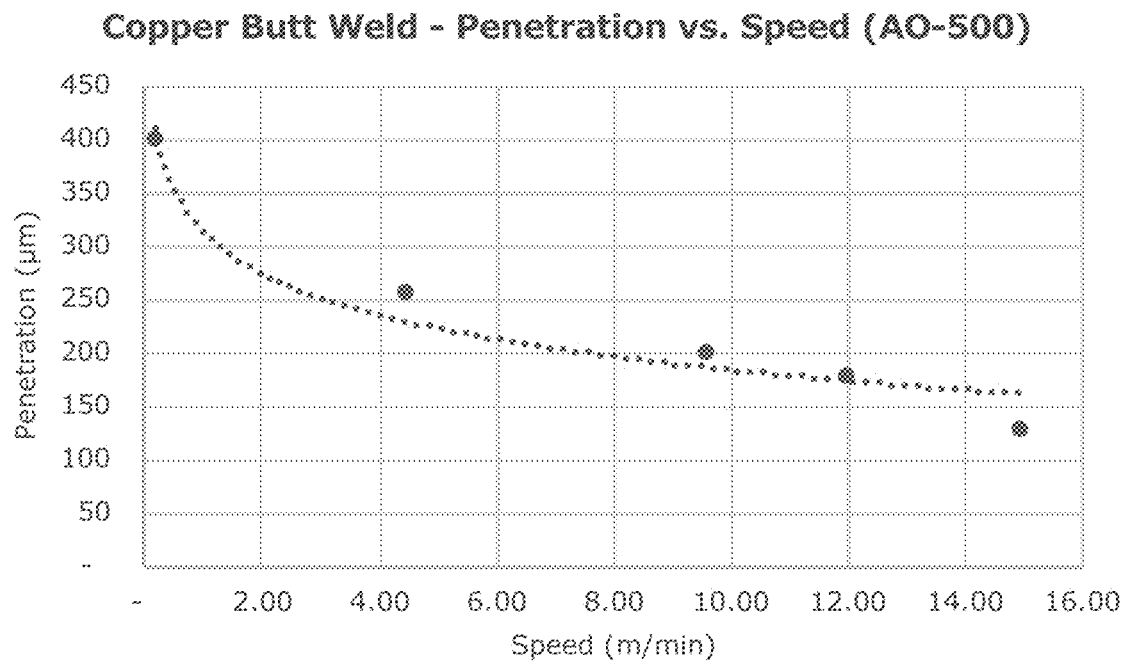
FIG. 24 is a graph of an embodiment of Coper 110 butt weld testing, showing penetration (μm) vs. speed m/min in accordance with the present inventions.

Using the laser, processes, and set up of Examples 8 and 8A, butt welding of samples was also evaluated. The parts were prepared the same as in the Example 8A and clamped with the same clamping force. The edge of the samples produced by the shear is the basis for the butt-welded parts. Some of the results of these tests are shown in FIG. 24. The weld speed is the speed at which the two parts can be joined with a full penetration weld showing on the backside of the welded parts. There is no observation of spatter during the weld or on the parts that were welded, indicating a conduction mode weld process.

Example 8C

Figure 25:
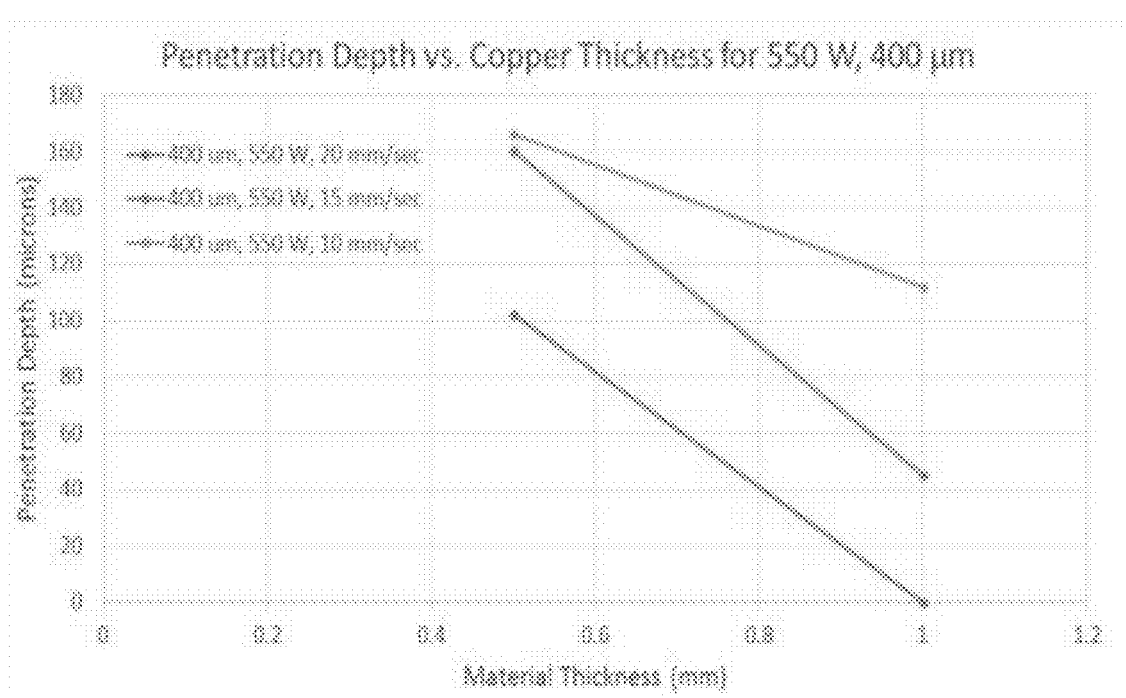
FIG. 25 is a graph of an embodiment of a conduction mode weld, showing the effect of the plate thickness on the penetration depth, in accordance with the present inventions.

During the evaluation of the Copper 110 series samples of Example 8A, a dependence on the penetration depth of the weld as a function of the sample thickness was observed. FIG. 25 shows how the penetration depth can decrease as the copper sample thickness increases. This dependence is due to the greater thermal mass of the part and the high thermal conductivity of copper which allows the heat to be dissipated rapidly away from the weld bead. This is in part because of the high thermal conductivity and the ability of the copper to effectively heat sink the laser energy during the welding process. As can be seen from FIG. 25, at a given speed the penetration depth can decrease by over a factor of four as the material thickness is increased by a factor of two. The penetration depth for the top case does not decrease as dramatically as the other two cases because it is at a much lower speed and it is saturating the copper's ability to heatsink the laser energy. Consequently, when designing a welding process for copper using the conduction mode process, the finite thickness of the parts to be welded should be taken into consideration.

Example 8D

Figure 26:
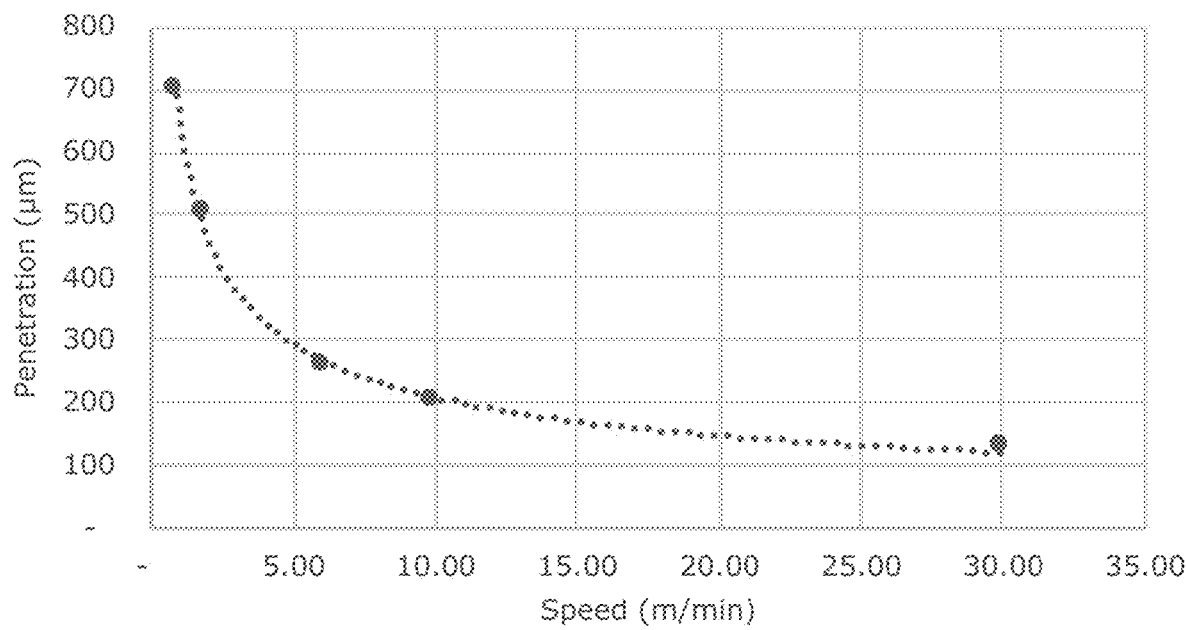
FIG. 26 is a graph of an embodiment of aluminum 1100 BOP testing showing penetration (μm) vs. speed m/min in accordance with the present inventions.

Using the laser, processes, and set up of Examples 8, and 8A, aluminum 1100 series samples are welded and evaluated. Aluminum 1100 series samples were prepared and mounted in the weld fixture the same as the copper parts in Example 8A. The weld process is similar to the cooper welding process, of Example 8A, with only the robot speed being changed. The weld speed shown in FIG. 26 is for the case where a full penetration bead is observed on the backside of the part of that thickness. There is no spatter from the melt puddle observed during the welding process.

Example 8E

Figure 27:
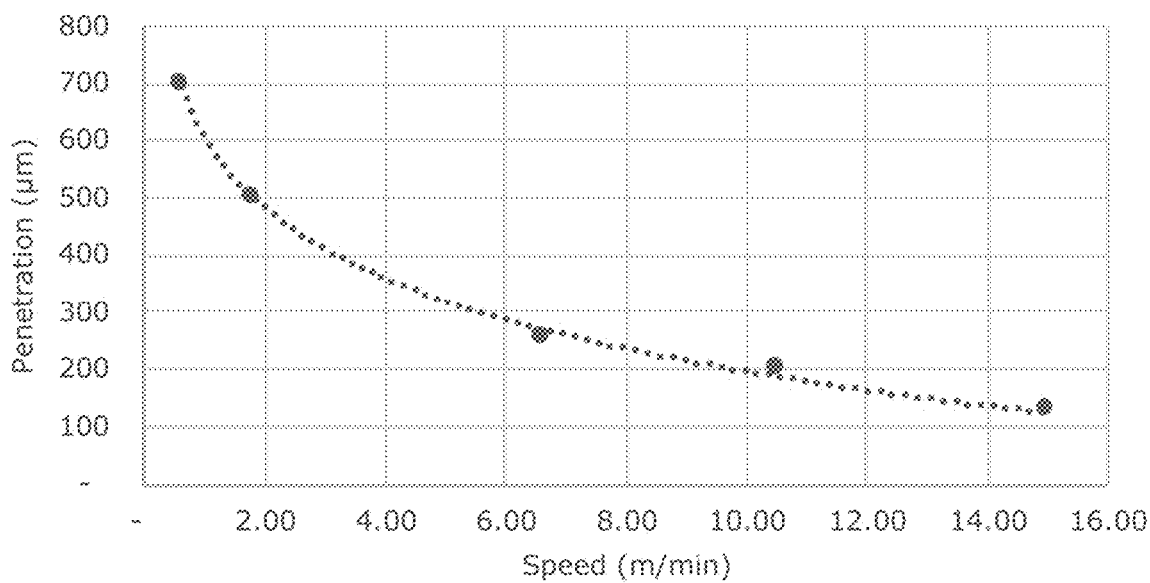
FIG. 27 is a graph of an embodiment of aluminum 110 butt weld testing, showing penetration (μm) vs. speed m/min in accordance with the present inventions.

Using the laser, processes, and set up of Examples 8 and 8A, butt welds and welding tests are performed for two Aluminum 1100 samples placed side by side in the welding fixture. The samples are prepared with a shear, and the two edges had no special preparation prior to the weld being performed. The samples are wiped down with acetone prior to the weld. The welding process is the same as described for the copper parts, in Exhibit 8A, except for the weld speed. The final weld speed plotted, is the speed at which a full penetration bead is obtained over the entire length of the samples being welded. A summary of this data is shown in FIG. 27.

Example 8F

Figure 28:
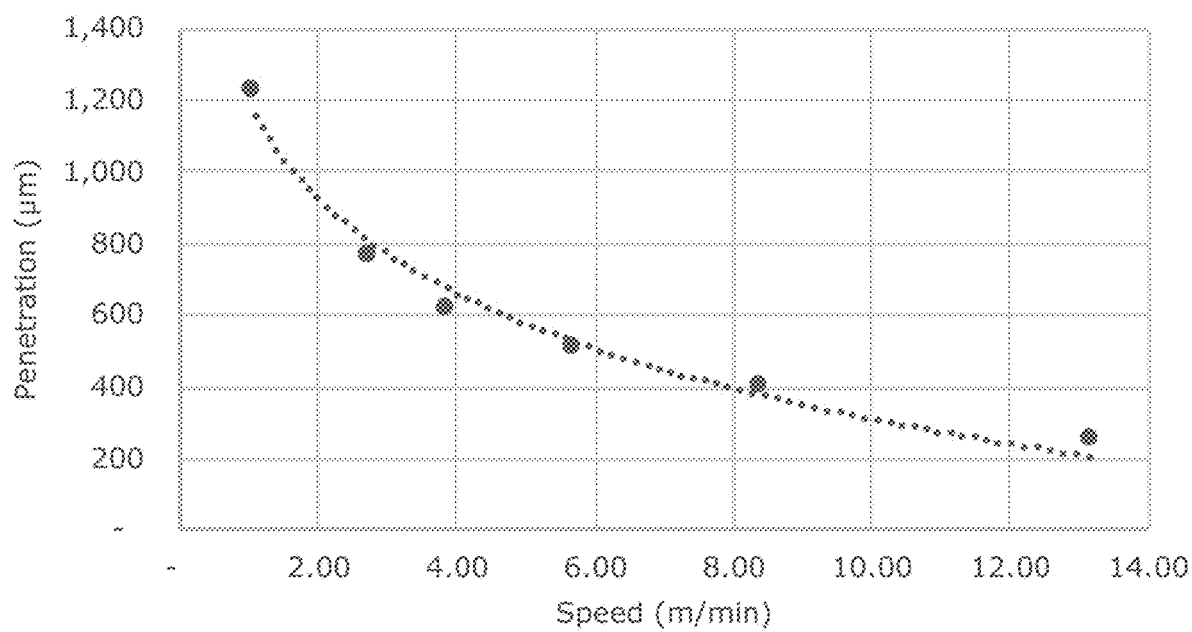
FIG. 28 is a graph of an embodiment of Stainless Steel 304 BOP testing showing penetration (μm) vs. speed m/min in accordance with the present inventions.

Using the laser, processes, and set up of Examples 8 and 8A, BOP welds and weld tests are conducted on 304 Stainless Steel samples. The samples are cut to the 10 mm×45 mm size that fits in the fixtures, wiped down with acetone and the robot speed was adjusted until a full penetration weld is obtained on the test sample. Again, there is no spatter or porosity noted in the welded samples. The results of this test are shown in FIG. 28.

Example 8G

Welds and evaluations of the 600 Watt system and process of Example 8 are conducted. A 100 mm focal length lens is used to focus the beam to a 200 µm spot size resulting in an average intensity of approximately 2.1 MW/cm2 and the peak intensity approaches 4.5 MW/cm2. A series of welds are made and tests are conducted at this higher power level and with a shorter focal length lens (100 mm) to further evaluate and illustrate the penetration capabilities of this laser at various speeds. In these tests the average intensity is 2.1 MW/cm2, a power density that is well within the requirements to vaporize either the copper and create a keyhole. The part is tilted at 20 degrees, decreasing the effective power density to 1.4 MW/cm2 which is sufficient intensity to initiate the keyhole welding mode in copper, aluminum and Stainless Steel.

The first indication of a keyhole process in copper at was a significant increase in spatter during the welding process. This spatter is observed with an on-axis camera while monitoring the weld puddle. The weld samples are cross sectioned, polished and etched revealing a micro structure freeze pattern typical of a keyhole weld. The cross section also reveals a significant amount or porosity where ever the beam did not fully penetrate the part. However, the sections where the beam fully penetrated showed nominal porosity.

Example 8H

Figure 29:
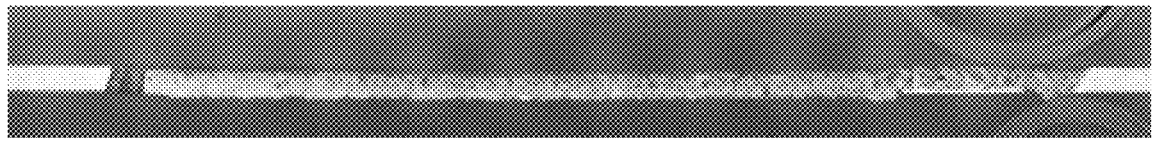
FIG. 29 is a photograph of an embodiment of a longitudinal cross section of an embodiment of a keyhole welded copper 110 plate showing the start of the full penetration region.

Using the laser, processes, and set up of Examples 8 and 8G, a longitudinal cross section of a keyhole mode weld on a 500 µm thick copper 110 plate is performed to determine the porosity along the entire length of the weld as shown in the photograph of FIG. 29. The first cm of the weld on the right hand side of the picture exhibited a substantial amount of porosity as well as a lack of penetration through the sample. As the heat builds up in the part during the weld, the keyhole process fully penetrates the copper plate. This result indicated that if the keyhole process is allowed to stabilize, then it is possible to produce welds with nominal spatter and porosity.

Example 8I

Figure 30:
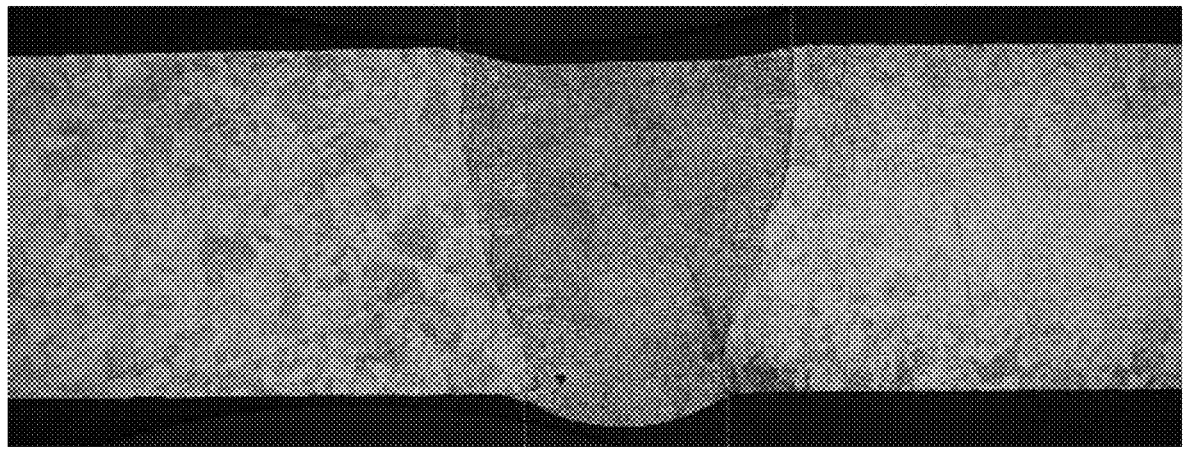
FIG. 30 is a photograph of an embodiment of a 1.016 mm thick copper welded at 1.1 m/min with minimal porosity and spatter in accordance with the present inventions.

Using the laser, processes, and set up of Examples 8 and 8G, and based on the results from Example 8H, welds and tests where the keyhole is allowed to stabilize first before moving the part are conducted. The welding process is modified by allowing the laser beam to dwell on the part for a short time period, then the robot is accelerated, dragging the keyhole through the part. After a series of tests varying the dwell time from 0.6 seconds to 1.5 seconds, the preferred results are achieved with the 0.6 second dwell time. FIG. 30 is a photograph of a cross section for a bead on plate weld of copper 110 performed with the 0.6 second dwell on the sample followed by translating the sample at a speed of 1.1 m/min. A series of welds are performed at this speed to verify that the process is stable and well controlled. All samples exhibited similar results, very low porosity, and a very stable keyhole weld.

Example 8J

Figure 31:
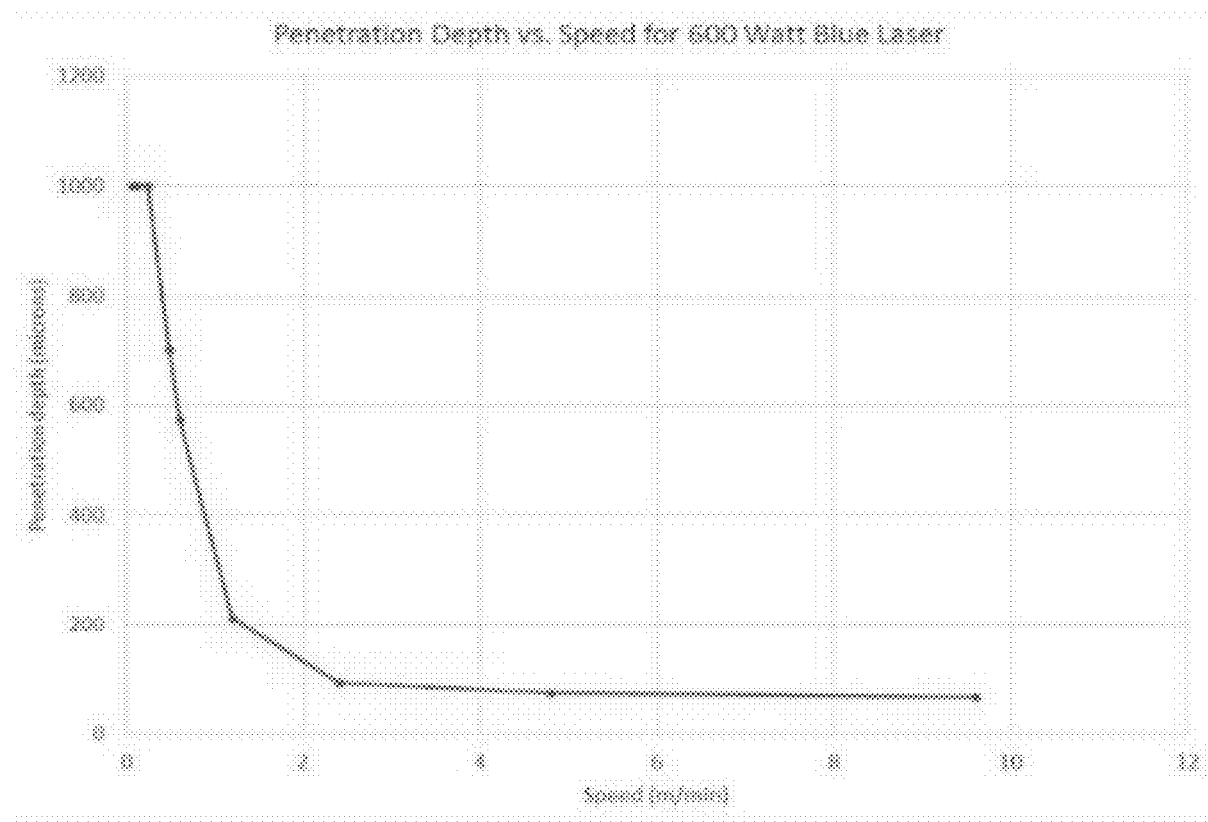
FIG. 31 is a graph showing penetration depth (μm) vs. speed (m/min) of an embodiment of a BOP test for copper 110 welded with 600 Watts and a 200 μm spot size in accordance with the present inventions.

Using the laser, processes, and set up of Examples 8 and 8G, welds are made and evaluated on a range of different copper 110 material thicknesses. A plot of the maximum weld speed achieved for full penetration of each sample is plotted in FIG. 31. Keyhole mode welding, translation mode welding, and conduction mode welds are all observed across these welding speeds. The result is a substantial increase in the welding speeds and penetration depths compared to the 500 Watt, 400 µm system.

Example 8K

Figure 32:
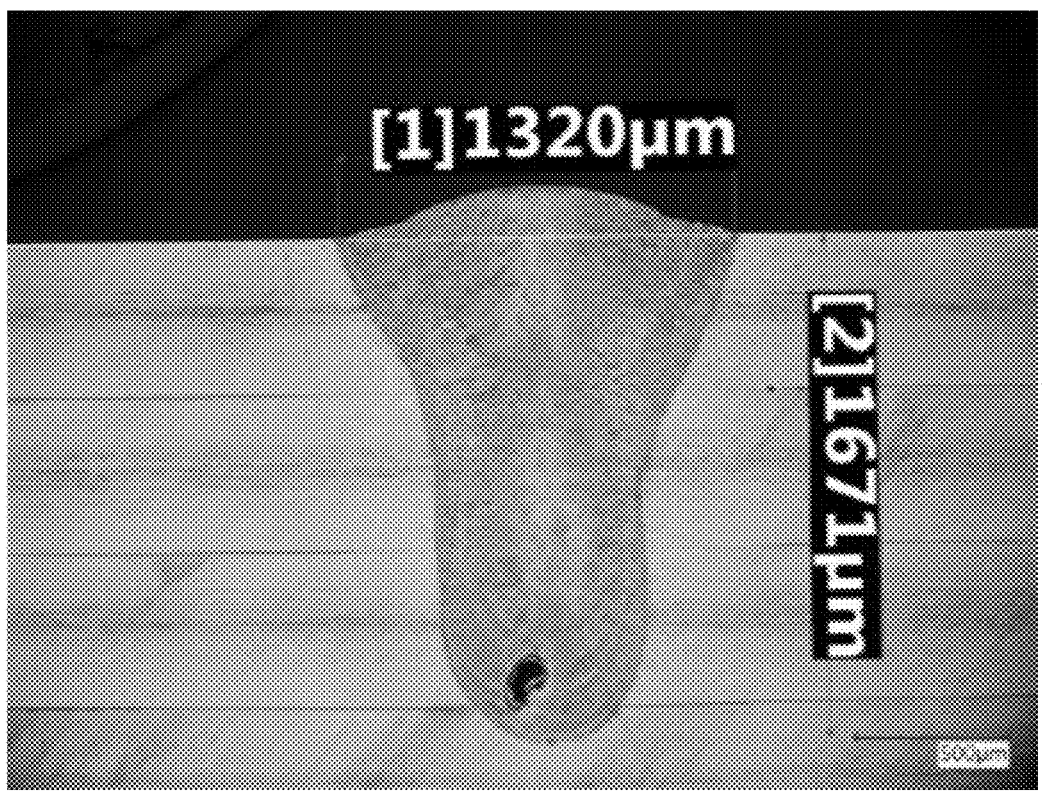
FIG. 32 is photograph of an embodiment of a keyhole lap weld of four sheets of Stainless Steel 304 in accordance with the present inventions.

Using the laser, processes, and set up of Examples 8 and 8G, a Stainless Steel sample is welded and evaluated. The result is the lap welding of four sheets of 304 Stainless Steel at a speed of 1.2 m/min. The cross section shown in FIG. 32, shows a classical profile of a keyhole welded sample. The porosity at the bottom of the keyhole may have been caused by the gap between the third and fourth sheet in the stack. This porosity can be eliminated by optimization of this welding process.

Example 9

Figure 33:
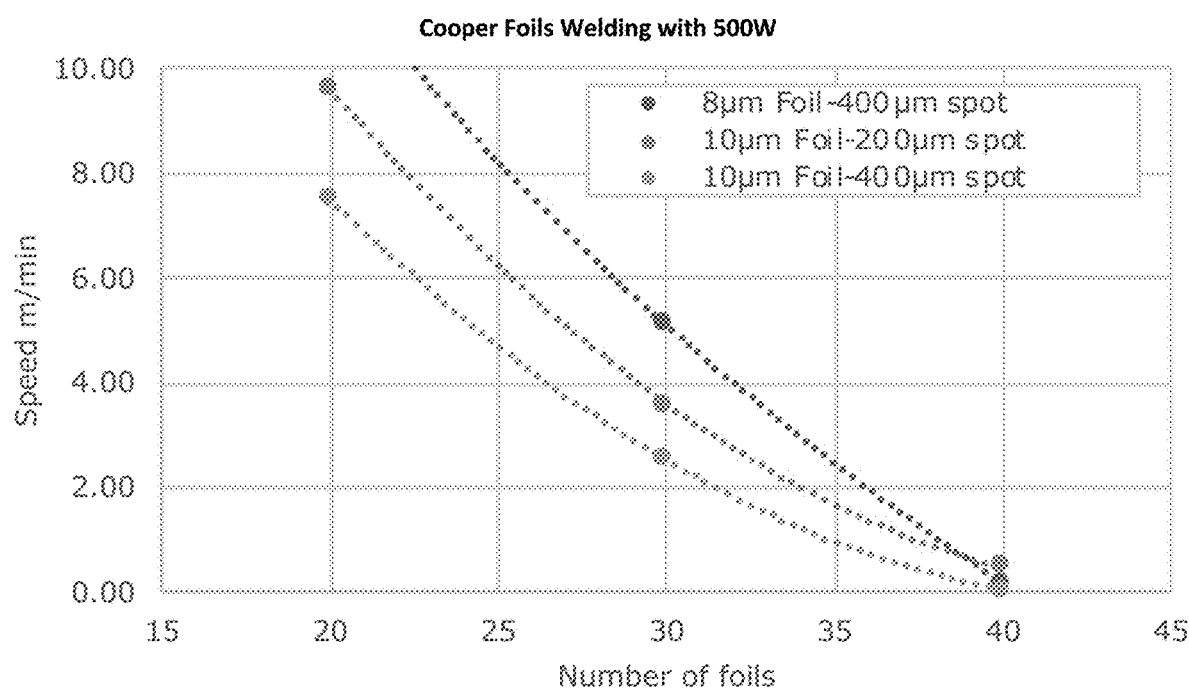
FIG. 33 is a graph of an embodiment of lap welding tests on stacks of copper 110 foils in accordance with the present inventions.

Using the laser, processes, and set up of Examples 8 and 8A, a series of tests are conducted with stacks of Oxygen Free Copper foils to determine how many sheets of foil can be lap welded in a single pass. The experimental setup is the same as Example 8, but now the fixture is changed and a small steel insert is used in the gap under the center of the parts. The foils are clamped in place and the sample, tilted at a 20-degree angle to the beam normal is passed through the beam with an Ar—$CO_2$ cover gas. The results of these tests are summarized in FIG. 33 for up to 40 foils in a stack. The two different lens configurations are used with very good results over a wide range of foil thickness and stacks.

Figure 34:
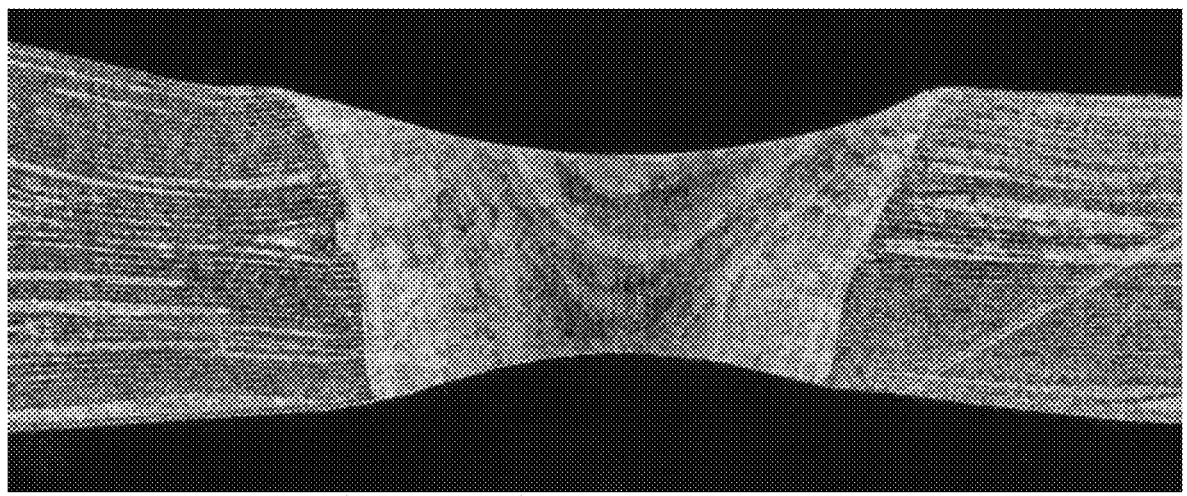
FIG. 34 is a photograph of an embodiment of a stack of 40, 10 mm thick copper 110 foils welded with a 500 Watt, 400 μm spot blue laser in accordance with the present inventions.

FIG. 34 is a photo of an example of a successful weld of 40 cooper foils with no porosity and no spatter on the top surface. This stack of foils was welded with 500 Watts and the 200 mm FL lens which corresponds to the 400 µm spot size. The weld speed was 0.5 m/min. The manner of clamping of the sheets can effect the weld quality, and good and consistent clamping of the sheets provide consistently high-quality welds.

Headings and Embodiments

It should be understood that the use of headings in this specification is for the purpose of clarity, and is not limiting in any way. Thus, the processes and disclosures described under a heading should be read in context with the entirely of this specification, including the various examples. The use of headings in this specification should not limit the scope of protection afford the present inventions.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Among others, embodiments of the present inventions can be used with the methods, devices and system of Patent Application Publication Nos. WO 2014/179345, US 2016/0067780, US 2016/0067827, US 2016/0322777, US 2017/0343729, US 2017/0341180, and US 2017/0341144 the entire disclosure of each of which are incorporated herein by reference. Additionally, these embodiments, for example, may be used with: other equipment or activities that may be developed in the future; and with existing equipment or activities which may be modified, in-part, based on the teachings of this specification. Further, the various embodiments set forth in this specification may be used with each other in different and various combinations. Thus, for example, the configurations provided in the various embodiments of this specification may be used with each other. For example, the components of an embodiment having A, A' and B and the components of an embodiment having A", C and D can be used with each other in various combination, e.g., A, C, D, and A. A" C and D, etc., in accordance with the teaching of this Specification. The scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

The invention claimed is:

1. A method of laser welding a plurality of copper foils together, the method comprising:
   a. positioning a plurality of pieces of copper foil in a welding stand; wherein the foil contains at least about 50% copper;
   b. exerting a clamping force on the plurality of pieces of copper foil to clamp the pieces of foil together in the welding stand;
   c. directing a blue laser beam along a laser beam path at the plurality of pieces of copper foil, wherein the laser beam has the following properties:
      i. at least 500 Watts of power;
      ii. a beam parameter product of about 44 mm mrad and less;
      iii. a spot size of about 400 μm and less;
      iv. an average intensity of at least of about 400 kW/cm$^2$;
      v. a peak intensity of at least about 800 kW/cm$^2$;
   d. the blue laser beam lap welding the plurality of pieces of copper foil together at a welding speed; and,
   e. providing a non-oxidizing beam clearing gas in a space along the laser beam path where the laser beam travels in free space from an optical element to the plurality of pieces of copper foil; wherein clearing gas removes plume material from the laser beam path and prevents oxidation of the plurality of pieces of copper foil;
   f. wherein the welding speed, clamping force, and a flow rate of the non-oxidizing clearing glass, are predetermined to thereby provide a lap weld having no visible splatter and no visible porosity.

2. The method of claim 1, wherein the beam is a CW beam.

3. The method of claim 1, wherein the beam is a pulsed beam.

4. The method of claim 1, wherein the beam has a wavelength of about 450 nm.

5. The method of claim 1, wherein the optical element is selected from the group consisting of a lens, a fiber face, and a window.

6. The method of claim 1, wherein the clearing gas is selected from the group consisting of Argon, Argon-CO$_2$, Air, Helium and Nitrogen.

7. The method of claim 1, wherein the laser beam is not wobbled; thereby providing a wobble free laser welding process.

8. The method of claim 1, wherein the plurality of pieces of copper foil has from 10 to 50 pieces of foil.

9. The method of claim 8, wherein each of the plurality of pieces of copper foil has a thickness of from about 80 μm to about 500 μm.

10. The method of claim 1, wherein a copper foil piece has a thickness of from about 80 μm to about 500 μm.

11. The method of claim 1, wherein the welding speed is at least 10 m/min.

12. A method of laser welding a plurality of metal pieces together, the method comprising:
   a. positioning a plurality of pieces of a metal in a welding stand;
   b. exerting a clamping force on the plurality of pieces of metal to clamp the pieces of metal together in the welding stand;
   c. directing a blue laser beam along a laser beam path at the plurality of pieces of metal, wherein the laser beam has the following properties:
      i. at least 500 Watts of power;
      ii. a beam parameter product of about 44 mm mrad and less;
      iii. a spot size of about 400 μm or less;
      iv. an average intensity at least of about 400 kW/cm$^2$;
      v. a peak intensity of at least about 800 kW/cm$^2$;
   d. the blue laser beam welding the plurality of pieces of metal together at a welding speed; and,
   e. providing a non-oxidizing beam clearing gas in a space along the laser beam path where the laser beam travels in free space from an optical element to the plurality of pieces of copper foil; wherein clearing gas removes plume material from the laser beam path and prevents oxidation of the plurality of pieces of copper foil;

f. wherein the welding speed, clamping force, and a flow rate of the non-oxidizing clearing glass, are predetermined to thereby provide a weld having no visible splatter and no visible porosity.

13. The method of claim 12, wherein the welding stand has an air gap below the pieces of metal.

14. The method of claim 12, wherein the metal is selected from the group consisting of aluminum, Stainless Steel, copper, aluminum based metals, Stainless Steel based metals, copper based metals, aluminum alloys, Stainless Steel alloys and copper alloys.

15. The method of claim 14, wherein the laser beam has a wavelength of about 450 nm.

16. The method of claim 15, wherein the laser beam is not wobbled, thereby providing a wobble free laser welding process.

17. The method of claim 16, wherein the weld is selected from the group of welds consisting of a lap weld, a butt weld, bead on plate weld and a conduction mode weld.

18. The method of claim 12, wherein the laser beam is not wobbled, thereby providing a wobble free laser welding process.

19. The method of claim 12, wherein the weld is selected from the group of welds consisting of a lap weld, a butt weld, bead on plate weld and a conduction mode weld.

20. A method of laser welding a plurality of copper foils together, the method comprising:

a. positioning a plurality of pieces of copper foil in a welding stand; wherein the foil contains at least about 50% copper; wherein the copper foil has a thickness of from about 80 μm to about 500 μm;

b. exerting a clamping force on the plurality of pieces of copper foil to clamp the pieces of foil together in the welding stand;

c. directing a blue laser beam along a laser beam path at the plurality of pieces of copper foil, wherein the laser beam has the following properties:
  i. at least 600 Watts of power;
  ii. a beam parameter product of about 44 mm mrad and less;
  iii. a spot size of about 200 μm to about 400 μm;
  iv. an average intensity at least of about 2.1 $MW/cm^2$;
  v. a peak intensity approaching at least about 4.5 $MW/cm^2$;

d. the blue laser beam welding the plurality of pieces of metal together at a welding speed of at least 10 m/min; and, e. providing a non-oxidizing beam clearing gas in a space along the laser beam path where the laser beam travels in free space from an optical element to the plurality of pieces of copper foil; wherein clearing gas removes plume material from the laser beam path and prevents oxidation of the plurality of pieces of copper foil;

f. wherein the welding speed, clamping force, and a flow rate of the non-oxidizing clearing glass, are predetermined to thereby provide a weld having no visible splatter and no visible porosity.

* * * * *

UNITED STATES PATENT AND TRADEMARK OFFICE
CERTIFICATE OF CORRECTION

PATENT NO. : 11,612,957 B2  
APPLICATION NO. : 16/730852  
DATED : March 28, 2023  
INVENTOR(S) : Mark S. Zediker et al.

Page 1 of 1

It is certified that error appears in the above-identified patent and that said Letters Patent is hereby corrected as shown below:

In the Claims

Claim 12, Column 29, Line 1: Please replace "copper foil" with "metal"

Claim 12, Column 29, Line 3: Please replace "copper foil" with "metal"

Signed and Sealed this  
Sixth Day of June, 2023

Katherine Kelly Vidal  
*Director of the United States Patent and Trademark Office*